United States Patent
Tani et al.

(10) Patent No.: US 7,704,913 B2
(45) Date of Patent: Apr. 27, 2010

(54) VISIBLE-LIGHT-RESPONSIVE THREE-DIMENSIONAL FINE CELL-STRUCTURED PHOTOCATALYTIC FILTER, ITS MANUFACTURING METHOD AND PURIFIER DEVICE

(75) Inventors: Eiji Tani, Tosu (JP); Kunio Kimura, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 856 days.

(21) Appl. No.: 10/554,235

(22) PCT Filed: Apr. 22, 2004

(86) PCT No.: PCT/JP2004/005786

§ 371 (c)(1),
(2), (4) Date: Oct. 23, 2006

(87) PCT Pub. No.: WO2004/094044

PCT Pub. Date: Nov. 4, 2004

(65) Prior Publication Data

US 2007/0144961 A1    Jun. 28, 2007

(30) Foreign Application Priority Data

Apr. 23, 2003  (JP) .............................. 2003-118073
Aug. 29, 2003  (JP) .............................. 2003-305620

(51) Int. Cl.
*B01J 27/224* (2006.01)
*B01J 23/00* (2006.01)
*B01J 21/18* (2006.01)

(52) U.S. Cl. ................... 502/182; 502/178; 502/350

(58) Field of Classification Search ............... 502/178, 502/182, 350
See application file for complete search history.

(56) References Cited

U.S. PATENT DOCUMENTS 5,069,885 A * 12/1991 Ritchie ....................... 422/186

| | | | |
|---|---|---|---|
| 5,262,199 A * | 11/1993 | Desu et al. | 427/255.32 |
| 5,429,780 A | 7/1995 | Prin et al. | |
| 5,449,654 A | 9/1995 | Prin et al. | |
| 5,516,492 A * | 5/1996 | Dong et al. | 422/186 |

(Continued)

FOREIGN PATENT DOCUMENTS

EP         0 757 024 A1       2/1997

(Continued)

OTHER PUBLICATIONS

Database WPI Week 200211, Thomson Scientific, London, GB; AN 2002-078082 XP002496258.

(Continued)

*Primary Examiner*—Patricia L Hailey
(74) *Attorney, Agent, or Firm*—Edwards Angell Palmer & Dodge LLP; David G. Conlin; Mark D. Russett

(57) ABSTRACT

A visible-light-responsive three-dimensional fine cell-structured photocatalytic filter in accordance with the present invention includes a sponge-like porous structure (B) containing an anatase-type titanium oxide coating formed on a surface of a sponge-like porous structural body (A) which has a porosity of 85 vol % or more. The sponge-like porous structural body (A) is composed of one material selected from the group consisting of one metal selected from the group consisting of (a) to (e): (a) carbon and either or both of silicon and a silicon alloy; (b) silicon carbide and at least one material selected from the group consisting of silicon, a silicon alloy, and carbon; (c) silicon nitride and at least one material selected from the group consisting of silicon, a silicon alloy, carbon, and silicon carbide; (d) carbon; and (e) carbon and one metal selected from the group consisting of titanium, vanadium, chromium, manganese, iron, cobalt, nickel, copper, ruthenium, rhodium, palladium, silver, platinum, and gold.

18 Claims, 5 Drawing Sheets

U.S. PATENT DOCUMENTS

| | | | |
|---|---|---|---|
| 6,238,631 B1 * | 5/2001 | Ogata et al. | 422/186.3 |
| 6,251,819 B1 | 6/2001 | Prin et al. | |
| 6,673,738 B2 * | 1/2004 | Ueda et al. | 502/180 |
| 2003/0050196 A1 | 3/2003 | Hirano et al. | |
| 2005/0084717 A1 * | 4/2005 | Tani et al. | 428/698 |
| 2005/0209088 A1 * | 9/2005 | Tani | 501/80 |
| 2006/0269683 A1 * | 11/2006 | Tani | 427/430.1 |
| 2009/0162567 A1 * | 6/2009 | Tseng et al. | 427/541 |

FOREIGN PATENT DOCUMENTS

| | | | |
|---|---|---|---|
| EP | 1 656 985 | * | 5/2006 |
| JP | 2633469 | | 4/1997 |
| JP | 2691751 | | 9/1997 |
| JP | 10-028875 A | | 2/1998 |
| JP | 2883761 | | 2/1999 |
| JP | 11-128631 | * | 5/1999 |
| JP | 11-335187 | | 12/1999 |
| JP | 2001-038218 | | 2/2001 |
| JP | 2001-179246 | | 7/2001 |
| JP | 2001-198437 | | 7/2001 |
| JP | 2001-510729 | | 8/2001 |
| JP | 2001-259435 A | | 9/2001 |
| JP | 2003-053194 A | | 2/2003 |
| WO | WO-88/00933 A1 | | 2/1988 |
| WO | WO-02/24333 A1 | | 3/2002 |
| WO | WO-03/014042 A1 | | 2/2003 |

OTHER PUBLICATIONS

Supplementary European Search Report dated Oct. 1, 2008, from corresponding EPO application No. 04728897.2.

* cited by examiner

US 7,704,913 B2

VISIBLE-LIGHT-RESPONSIVE THREE-DIMENSIONAL FINE CELL-STRUCTURED PHOTOCATALYTIC FILTER, ITS MANUFACTURING METHOD AND PURIFIER DEVICE

CROSS-REFERENCE TO RELATED APPLICATION(S)

This application is a §371 of PCT Application Ser. No. PCT/JP2004/005786, filed Apr. 22, 2004, which application designates the United States and which application is incorporated by reference in its entirety.

TECHNICAL FIELD

The present invention relates in general to visible-light-responsive three-dimensional fine cell-structured photocatalytic filters, their manufacturing methods, and purifier devices using such filters. In particular, the invention relates to three-dimensional fine cell-structured photocatalytic filters which exhibit highly efficient photocatalytic action under visible light as well as under ultraviolet light, and also to their manufacturing methods and purifier devices which are capable of purifying polluted air containing NOx and/or other toxic substances and obtaining clean water from polluted water at high efficiency.

BACKGROUND ART

Placed in sunlight or under a fluorescent lamp, especially at ultraviolet wavelengths, titanium oxide shows strong oxidation on its surface due to photocatalytic action. It is well-known that the oxidation removes organic compounds and toxic matter, such as bacteria, that are in contact with the titanium oxide. See Japanese patent 2883761 (published on Jun. 22, 1993; registered on Feb. 5, 1999; hereinafter, "patent document" 1), for example. However, titanium oxide is powdery; if it is used as such, the powdery titanium oxide (titanium oxide powder) may scatter in gas or fluid. Titanium oxide powder needs be in a solid form for convenient use. How this "fixing" of titanium oxide powder is done greatly affects the probability of the titanium oxide coming in contact with toxic substances. Further, if no light reaches titanium oxide, no photocatalytic action occurs. Conventionally, titanium oxide is fixed onto substrates of various shapes as described in patent document 1: many other alternatives are also proposed including films, glass beads, silica gel, and stainless steel wool.

In Japanese Unexamined Patent Publication, or Tokukai, 2001-179246 (published on Jul. 3, 2001; hereinafter, "patent document" 2), one of the inventors of the present invention suggested a purifier device using fine hollow glass spheres coated with titanium oxide. The purifier device (not shown) has a light source and an enclosure tube. The space between the light source and tube is filled with numerous fine, hollow glass spheres coated with titanium oxide. The device is capable of purifying polluted fluid by simple operation and without concern for secondary pollution. However, the fine, hollow glass spheres do not allow sufficient ultraviolet to reach the titanium oxide. Demands are there for further improvement on the photocatalytic action.

Hence, the purifier device of patent document 2 suggested by one of the inventors of the present invention is indeed innovative, but falls short of stretching the photocatalyst to the limit.

With growing use of photocatalysts, expectations are rising also for visible-light-responsive three-dimensional fine cell-structured photocatalytic filters that function in sunlight and under other visible light sources, as well as across the ultraviolet range of spectrum, at high efficiency. We expect that if we can purify polluted air and water in sunlight at high efficiency, we will not have to use electricity, and the use of photocatalysts will dramatically expand.

DISCLOSURE OF INVENTION

The present invention has an objective to provide a visible-light-responsive three-dimensional fine cell-structured photocatalytic filter and a manufacturing method for the filter. The filter allows simple control of light shining on the photocatalyst, functions under visible light, exhibits highly efficient photocatalytic action, and is easy to manufacture.

The present invention has another objective to provide a purifier device which allows simple control of light shining on the photocatalyst and exhibits highly efficient photocatalytic action under visible light.

The inventors of the present invention have worked diligently to achieve the objectives. Preferable filters for improved purification operation are those with high probability of contacting with fluid. Those with high contact probability are ceramic honeycomb and three-dimensional ceramic-form filters (hereinafter, "three-dimensional ceramic filters"). Among them, the three-dimensional ceramic filter has the highest probability of contacting with fluid. For example, the conventional ceramic-form filters for cast iron available from Bridgestone Corporation are three-dimensional ceramic filters. These conventional three-dimensional ceramic filters are however not designed to transmit light.

The ceramic-form filters are porous silicon carbide structural bodies that are manufactured by impregnating a sponge with a silicon carbide powder slurry, removing excess slurry, and then drying and sintering the sponge. According to their physical properties disclosed by the company, the porosity is about 85%, and the bulk density is about 0.42 $g/cm^3$.

The inventors of the present invention have diligently investigated and found that photocatalysts fixed on three-dimensional ceramic filters, like those above for cast iron, do not exhibit photocatalytic action under visible light, for example, under a fluorescent lamp.

More specifically, the ceramic-form filters for cast iron are prepared by sintering the silicon carbide powder. So, the ceramic-form filters for cast iron show poor mechanical strength at crosslinks in the sponge-like base structure unless the slurry is sufficiently thick. Slurries, thickened to address this problem, have porosities below 85 vol %. Excess slurry clogs pores where cells will form. The crosslinks in the sponge-like base structure also increases its thickness. In addition, the smaller the cells, the more likely the pores are clogged by excess slurry.

The conventional three-dimensional ceramic filters are not designed to transmit light. Further, the filters are prepared by sintering. So, the slurry needs to be formed with a sufficiently thickness. The crosslinks in the sponge-like base structure on average (average thickness of the base structure) become relatively thick. As described above, the porosity falls below 85 vol %. Excess slurry remains and clogs the pores of those parts which will be cells. This inhibits flow, and prevents sufficient amounts of light from getting in.

Accordingly, to achieve the above objectives, a visible-light-responsive three-dimensional fine cell-structured photocatalytic filter in accordance with the present invention is characterized by including a sponge-like porous structure (B)

containing an anatase-type titanium oxide coating formed on a surface of a sponge-like porous structural body (A) which has a porosity of 85 vol % or more. Further, the sponge-like porous structural body (A) is composed of one material selected from the following (a) to (e): (a) carbon and either or both of silicon and a silicon alloy; (b) silicon carbide and at least one material selected from the group consisting of silicon, a silicon alloy, and carbon; (c) silicon nitride and at least one material selected from the group consisting of silicon, a silicon alloy, carbon, and silicon carbide; (d) carbon; and (e) carbon and one metal selected from the group consisting of titanium, vanadium, chromium, manganese, iron, cobalt, nickel, copper, ruthenium, rhodium, palladium, silver, platinum, and gold.

To achieve the objectives, another visible-light-responsive three-dimensional fine cell-structured photocatalytic filter in accordance with the present invention is characterized in that the filter has a sponge-like porous structure (B) having a surface on which a titanium oxide coating is provided. Further, the structure (B) is prepared by: immersing, in a solution containing or generating titanium oxide, a sponge-like porous structural body (A) containing carbon and either or both of silicon and a silicon alloy and having a porosity of 85 vol % or more; drying the immersed structural body (A); and thereafter firing the dried structural body (A) at 100° C. to 800° C. in an oxidizing atmosphere.

To achieve the objectives, another visible-light-responsive three-dimensional fine cell-structured photocatalytic filter in accordance with the present invention is characterized in that the filter has a sponge-like porous structure (B) having a surface on which a titanium oxide coating is provided. Further, the sponge-like porous structure (B) is prepared by: immersing, in a solution containing or generating titanium oxide, a sponge-like porous structural body (A) containing silicon carbide and at least one material selected from the group consisting of silicon, a silicon alloy, and carbon and having a porosity of 85 vol % or more; drying the immersed structural body (A); and thereafter firing the dried structural body (A) at 100° C. to 800° C. in an oxidizing atmosphere.

To achieve the objectives, another visible-light-responsive three-dimensional fine cell-structured photocatalytic filter in accordance with the present invention is characterized in that the filter has a sponge-like porous structure (B) having a surface on which a titanium oxide coating is provided. Further, the sponge-like porous structure (B) is prepared by: immersing, in a solution containing or generating titanium oxide, a sponge-like porous structural body (A) containing silicon nitride and at least one material selected from the group consisting of silicon, a silicon alloy, carbon, and silicon carbide and having a porosity of 85 vol % or more; drying the immersed structural body (A); and thereafter firing the dried structural body (A) at 100° C. to 800° C. in an oxidizing atmosphere.

To achieve the objectives, another visible-light-responsive three-dimensional fine cell-structured photocatalytic filter in accordance with the present invention is characterized in that the filter has a sponge-like porous structure (B) having a surface on which a titanium oxide coating is provided. Further, the structure (B) is prepared by: immersing, in a solution containing or generating titanium oxide, a sponge-like porous structural body (A) containing carbon and having a porosity of 85 vol % or more; drying the immersed structural body (A); and thereafter firing the dried structural body (A) at 100° C. to 500° C. in an oxidizing atmosphere.

To achieve the objectives, another visible-light-responsive three-dimensional fine cell-structured photocatalytic filter in accordance with the present invention is characterized in that the filter has a sponge-like porous structure (B) having a surface on which a titanium oxide coating is provided. Further, the sponge-like porous structure (B) is prepared by: immersing, in a solution containing or generating titanium oxide, a sponge-like porous structural body (A), containing carbon and one metal selected from the group consisting of titanium, vanadium, chromium, manganese, iron, cobalt, nickel, copper, ruthenium, rhodium, palladium, silver, platinum, and gold and having a porosity of 85 vol % or more; drying the immersed structural body (A); and thereafter firing the dried structural body (A) at 100° C. to 500° C. in an oxidizing atmosphere.

To achieve the objectives, a purifier device in accordance with the present invention is characterized by including the visible-light-responsive three-dimensional fine cell-structured photocatalytic filter in accordance with the present invention.

To achieve the objectives, a method of manufacturing a visible-light-responsive three-dimensional fine cell-structured photocatalytic filter in accordance with the present invention is characterized by the sequential steps of: immersing, in a solution containing or generating titanium oxide, a sponge-like porous structural body (A) containing carbon and either or both of silicon and a silicon alloy and having a porosity of 85 vol % or more; drying the immersed structural body (A); and firing the dried structural body (A) at 100° C. to 800° C. in an oxidizing atmosphere.

To achieve the objectives, another method of manufacturing a visible-light-responsive three-dimensional fine cell-structured photocatalytic filter in accordance with the present invention is characterized by the sequential steps of: immersing, in a solution containing or generating titanium oxide, a sponge-like porous structural body (A) containing silicon carbide and at least one material selected from the group consisting of silicon, a silicon alloy, and carbon and having a porosity of 85 vol % or more; drying the immersed structural body (A); and firing the dried structural body (A) at 100° C. to 800° C. in an oxidizing atmosphere.

To achieve the objectives, another method of manufacturing a visible-light-responsive three-dimensional fine cell-structured photocatalytic filter in accordance with the present invention is characterized by the sequential steps of: immersing, in a solution containing or generating titanium oxide, a sponge-like porous structural body (A) containing silicon nitride and at least one material selected from the group consisting of silicon, a silicon alloy, carbon, and silicon carbide and having a porosity of 85 vol % or more; drying the immersed structural body (A); and firing the dried structural body (A) at 100° C. to 800° C. in an oxidizing atmosphere.

To achieve the objectives, another method of manufacturing a visible-light-responsive three-dimensional fine cell-structured photocatalytic filter in accordance with the present invention is characterized by the sequential steps of: immersing, in a solution containing or generating titanium oxide, a sponge-like porous structural body (A) containing carbon and having a porosity of 85 vol % or more; drying the immersed structural body (A); and firing the dried structural body (A) at 100° C. to 500° C. in an oxidizing atmosphere.

To achieve the objectives, another method of manufacturing a visible-light-responsive three-dimensional fine cell-structured photocatalytic filter in accordance with the present invention is characterized by the sequential steps of: immersing, in a solution containing or generating titanium oxide, a sponge-like porous structural body (A) containing carbon and one metal selected from the group consisting of titanium, vanadium, chromium, manganese, iron, cobalt, nickel, copper, ruthenium, rhodium, palladium, silver, platinum, and gold and having a porosity of 85 vol % or more; drying the immersed structural body (A); and firing the dried structural body (A) at 100° C. to 500° C. in an oxidizing atmosphere.

These arrangements provide visible-light-responsive three-dimensional fine cell-structured photocatalytic filters and manufacturing methods for the filters. The filters allow simple control of light shining on the photocatalyst, function under visible light, exhibits highly efficient photocatalytic action, and is easy to manufacture.

Also, the arrangement provides a purifier device which allows simple control of light shining on the photocatalyst and exhibits highly efficient photocatalytic action under visible light.

Now, the present invention will be described in detail.

First, a purifier device in accordance with an embodiment of the present invention will be described in reference to FIG. 1. FIG. 1 is a cross-sectional view of a purifier device with an optically transparent window in accordance with an embodiment of the present invention.

In FIG. 1, 1 is a flat container made of, for example, resin; 1a is a fluid inlet; 1b is a fluid outlet; 1c is a partition wall forming an internal zigzag passage; and 2 is a visible-light-responsive three-dimensional fine cell-structured photocatalytic filter. The base structure of the filter 2 has crosslinks having an average thickness of 1 mm or less. The filter 2 has a porosity of 85 vol % or more. The filter 2 contains either carbon; silicon and carbon in a Si/C molar ratio of 0.1 to 2; silicon and silicon carbide in a Si/SiC molar ratio of 0.1 to 4; or titanium and carbon in a Ti/C molar ratio of 0.1 to 2. The filter 2 has a surface coated with titanium oxide. The titanium may be replaced with at least one metal selected from the group consisting of iron, cobalt, nickel, copper, ruthenium, rhodium, palladium, silver, platinum, gold, vanadium, chromium, and manganese. The visible-light-responsive three-dimensional fine cell-structured photocatalytic filter 2 is made of planar filter units each measuring from 5 mm to 30 mm, preferably from 5 mm to 20 mm, in thickness. Stacked in the internal zigzag passage, multiple filters 2 are accommodated in the container 1 as shown in FIG. 1. The partition wall 1c is a plate as thin as approximately 1 mm, presenting no obstacle to the stacking of the visible-light-responsive three-dimensional fine cell-structured photocatalytic filters 2. The visible-light-responsive three-dimensional fine cell-structured photocatalytic filter 2 is not limited to the size of from 5 mm to 30 mm. The filter 2 may be made of filter units which are rather large rectangular pieces and connected for use. 3 is an optically transparent window (optically transparent area in accordance with the present invention) on the front of the flat container 1. The window 3 is made of transparent glass or resin plate, for example. The optically transparent area may cover the whole container 1. The purifier device shown in FIG. 1 carries out no physical filtering. A physical filter element (not shown) is provided upstream to the fluid inlet 1a.

A fluid, as introduced through the fluid inlet 1a, enters the container 1 where it is subjected to highly efficient photocatalytic action due primarily to visible light or ultraviolet coming in through the optically transparent window 3. The fluid flows through the internal zigzag passage and exits through the fluid outlet 1b. The internal passage can take an extended length because it zigzags. The passage is compact and enables efficient processing. With the planar filter units being stacked, the purifier device allows external light to reach the interior. The device is easy to shape and assemble.

As described in the foregoing, the purifier device in FIG. 1 responds to visible light and contains the container 1 and the photocatalytic filter accommodated in the container 1. The container 1 is provided with the fluid inlet 1a and the fluid outlet 1b on opposite sides. The exterior (external wall) of the container 1 is provided with the optically transparent area through which visible and/or ultraviolet light can transmit. The photocatalytic filter purifies the fluid flowing from the fluid inlet 1a under visible and/or ultraviolet light coming in through the optically transparent area. The fluid is then discharged through the fluid outlet 1b. The photocatalytic filter is made up of filter units each of which is a planar, visible-light-responsive, three-dimensional fine cell-structured photocatalytic filter in accordance with the present invention.

Owing to the provision of the optically transparent area, the purifier device allows fluid flow and transmission of visible light (e.g. sunlight) or ultraviolet, or both. The area is made of, for example, transparent glass or resin plate, and covers at least a part of the exterior (it may cover a part of the exterior or the whole exterior). Also, by the use of planar filter units each measuring from 5 mm to 30 mm, preferably from 5 mm to 20 mm, in thickness, a purifier device is obtained with the following features: The device allows external light to reach the interior. The device is easy to shape and assemble. The device runs on low cost as long as it functions under visible light (e.g. sunlight). The device is cheap and achieves highly efficient photocatalytic action on gas, liquid, etc. containing pollutants.

Next, a purifier device in accordance with another embodiment of the present invention will be described in reference to FIG. 5. FIG. 5 is a cross-sectional view of a purifier device with an internal light source in accordance with another embodiment of the present invention.

FIG. 1 showed a flat purifier device with an optically transparent window (optically transparent area) through which ultraviolet is shone. In contrast, FIG. 5 shows a purifier device with a light source 6 inside a container 4, or more specifically, in an internal tube 7 inside the container 4.

This purifier device in accordance with the present invention feeds light to a visible-light-responsive three-dimensional fine cell-structured photocatalytic filter in accordance with the present invention. To this end, for example, the filter is used, and light is shone through the optically transparent area. Alternatively, the filter is given an annular shape, a fluid is flown, and light is shone from a centrally located light source in a space.

In FIG. 5, 4 is a cylindrical container; 4a is a fluid inlet; 4b is a fluid outlet, 5 is an annular, visible-light-responsive, three-dimensional fine cell-structured photocatalytic filter; and 7 is an internal tube.

The annular, visible-light-responsive, three-dimensional fine cell-structured photocatalytic filter 5 may be similar to the visible-light-responsive three-dimensional fine cell-structured photocatalytic filter 2. In FIG. 5, the visible-light-responsive three-dimensional fine cell-structured photocatalytic filter 5 is arranged as follows: Its base structure has crosslinks having an average thickness of 1 mm or less. Its porosity is 85 vol % or more. It contains either carbon; silicon and carbon in a Si/C molar ratio of 0.1 to 2; silicon and silicon carbide in a Si/SiC molar ratio of 0.1 to 4; or titanium and carbon in a Ti/C molar ratio of 0.1 to 2. The filter 5 also has a surface coated with titanium oxide. As was the case with the purifier device shown in FIG. 1, the titanium in the purifier device shown in FIG. 5 may be replaced with at least one metal selected from the group consisting of iron, cobalt, nickel, copper, ruthenium, rhodium, palladium, silver, platinum, gold, vanadium, chromium, and manganese.

The annular, visible-light-responsive, three-dimensional fine cell-structured photocatalytic filter 5 is an annular filter unit measuring 20 to 40 mm in inside diameter, 50 to 80 mm in outside diameter, and 20 to 30 mm in height. Stacked along the length of the internal tube 7, that is, the length of the light source 6, multiple filters 5 are accommodated in the container 4 as shown in FIG. 5. In the purifier device in FIG. 5, 6 may be a light source, such as a black-light lamp, a germicidal lamp, or a fluorescent lamp. 7 is made of optically transparent glass, resin, or another material. 8 is a physical filter. In the FIG. 5 purifier device, a physical filter 8 is located at the entry to the annular, visible-light-responsive, three-dimensional fine cell-structured photocatalytic filter 5 in the fluid inlet 4a; another one is located at the exit from the annular, visible-light-responsive, three-dimensional fine cell-structured photocatalytic filter 5 in the fluid outlet 4b.

In the FIG. 5 purifier device, a fluid, as introduced through the fluid inlet 4a, again enters the container 4 where it is subjected to highly efficient photocatalytic action due primarily to visible light or ultraviolet coming from the light source 6. The fluid then exits through the fluid outlet 4b. The purifier device is compact, allows simple control of light shining on the photocatalyst, and provides highly efficient photocatalytic action.

As described in the foregoing, the purifier device in FIG. 5 responds to visible light and contains the container 4, the annular photocatalytic filter, and the light source 6. The container 4 is provided with the fluid inlet 4a and the fluid outlet 4b on opposite sides. The annular photocatalytic filter is accommodated inside the container 4 and has a cylindrical space in it. The light source 6 sits inside the cylindrical space of the annular photocatalytic filter and shines visible and/or ultraviolet light. The photocatalytic filter purifies the fluid flowing from the fluid inlet 4a under visible and/or ultraviolet light shone by the light source 6. The fluid is then discharged through the fluid outlet 4b. The photocatalytic filter is made of up filter units each of which is an annular, visible-light-responsive, three-dimensional fine cell-structured photocatalytic filter in accordance with the present invention.

According to the arrangement, the resultant purifier device achieves highly efficient photocatalytic action on gas, liquid, etc. containing pollutants. The purifier device shown in FIG. 5 contains an annular filter unit inside the container 4 with the fluid inlet 4a and the fluid outlet 4b located on opposite sides. Therefore, the device is especially easy to assemble. The purifier device is readily manufactured by disposing a black-light lamp, a germicidal lamp, or a fluorescent lamp in the cylindrical space inside the annular filter unit either directly or via the internal tube 7.

The foregoing concrete examples assumed the 1 mm or less average thickness for the crosslinks in the base structure and the 85 vol % or more porosity. The examples further assumed that the visible-light-responsive three-dimensional fine cell-structured photocatalytic filter contains either carbon; silicon and carbon in a Si/C molar ratio of 0.1 to 2; silicon and silicon carbide in a Si/SiC molar ratio of 0.1 to 4; or titanium and carbon in a Ti/C molar ratio of 0.1 to 2 and that the filter has a surface coated with titanium oxide. These assumptions by no means are limiting the present invention.

A visible-light-responsive three-dimensional fine cell-structured photocatalytic filter in accordance with the present invention includes a sponge-like porous structure (B) containing an anatase-type titanium oxide coating formed on a surface of a sponge-like porous structural body (A) which has a porosity of 85 vol % or more. Also, the sponge-like porous structural body (A) is composed of one material selected from the following (a) to (e): (a) carbon and either or both of silicon and a silicon alloy; (b) silicon carbide and at least one material selected from the group consisting of silicon, a silicon alloy, and carbon; (c) silicon nitride and at least one material selected from the group consisting of silicon, a silicon alloy, carbon, and silicon carbide; (d) carbon; and (e) carbon and one metal selected from the group consisting of titanium, vanadium, chromium, manganese, iron, cobalt, nickel, copper, ruthenium, rhodium, palladium, silver, platinum, and gold.

Consider, first, those cases where the sponge-like porous structural body (A) is composed of (a) carbon and either or both of silicon and a silicon alloy. This visible-light-responsive three-dimensional fine cell-structured photocatalytic filter is readily manufactured by: immersing, in a solution containing or generating titanium oxide, a sponge-like porous structural body (A) containing carbon and either or both of silicon and a silicon alloy and having a porosity of 85 vol % or more; drying the immersed structural body (A); and firing the dried structural body (A) at 100° C. to 800° C. in an oxidizing atmosphere.

Put differently, this visible-light-responsive three-dimensional fine cell-structured photocatalytic filter contains the sponge-like porous structure (B) having a surface on which a titanium oxide coating is provided. The sponge-like porous structure (B) is prepared by: immersing, in a solution containing or generating titanium oxide, a sponge-like porous structural body (A) containing carbon and either or both of silicon and a silicon alloy and having a porosity of 85 vol % or more; drying the immersed structural body (A); and thereafter firing the dried structural body (A) at 100° C. to 800° C. in an oxidizing atmosphere.

In the present invention, the solution containing titanium oxide is, for example, a titanium oxide sol or a slurry containing amorphous or anatase-type titanium oxide particles. The solution generating titanium oxide is, for example, a chloride, nitrate compound, sulfate compound, organic compound, or any other compound of titanium that produces titanium oxide after thermal or chemical decomposition.

Specific examples of the solvent for the solution include water and aqueous solutions of hydrochloric acid. The titanium oxide concentration in the solution is preferably in a range of 5 wt % to 10 wt % so that a sufficient amount is produced in a single process.

In examples which will be detailed later, used as the solution containing titanium oxide was a commercially available titanium oxide coating agent for photocatalytic use (Tayca Corporation; sold under the name "TKC-303"). This is however by no means limiting the present invention.

The visible-light-responsive three-dimensional fine cell-structured photocatalytic filter has numerous fine cells interconnected by crosslinks (three-dimensional netlike base structure). The sponge-like porous structural body (A) contains carbon and either or both of silicon and a silicon alloy and has a porosity 85 vol % or more. The filter therefore readily holds titanium oxide (i.e. photocatalyst) and allows simple control of light shining on the photocatalyst. Also, the filter has a high transmittance and shows an increased retain ratio for titanium oxide. The filter is made of, for example, carbon and silicon, thereby containing free silicon; the filter exhibits effective photocatalytic action under visible light. Further, the filer exhibits highly efficient photocatalytic action due to the titanium oxide fired at 100° C. to 800° C. in an oxidizing atmosphere. The filter is easy to manufacture.

The titanium oxide is fired at 100° C. to 800° C. for the following reasons: If fired below 100° C., the titanium oxide, or photocatalyst, does not remain well on the filter. The titanium oxide is retained only insufficiently. If fired at elevated temperatures, the diameter of resultant crystallites becomes too large, which adversely affects photocatalytic activity. If fired beyond 800° C., the titanium oxide transforms from anatase-type crystal structure to rutile-type crystal structure.

This causes the titanium oxide, as a photocatalyst, to show poor purification efficiency. The titanium oxide is active as photocatalyst when it is of an anatase type.

As described above, the visible-light-responsive three-dimensional fine cell-structured photocatalytic filter in accordance with the present invention has anatase-type titanium oxide formed fixedly on the surface of the sponge-like porous structural body (A).

The sponge-like porous body containing carbon is preferably fired at temperatures not higher than 500° C. at which carbon starts to oxidize. However, if the porous body is fired quickly at 500° C. or beyond in an oxidizing atmosphere, the carbon does not oxidize. The carbon is preferably amorphous for excellent mechanical strength. Such a carbon is available by carbonizing resin, for example.

If, for example, a three-dimensional ceramic filter prepared by sintering from a silicon carbide powder is used as the sponge-like porous structural body (A), the average thickness of crosslinks in the sponge-like base structure (average thickness of the base structure) may grow excessively, reducing porosity, and excess slurry may remain and clog pores where cells will form. The foregoing method in accordance with the present invention, however, is free from these phenomena. The method provides sufficient photocatalytic action under visible light from, for example, a fluorescent lamp.

Prior to this application, one of the inventors of the present invention developed a new three-dimensional ceramic filter, which was not at all related to photocatalyst. This ceramic filter retains almost all pores open. Also, the filter has crosslinks in a sponge-like base structure which are approximately as thin as those in the material for the ceramic filter. The inventor discloses a silicon carbide-based thermostable ultralightweight porous material manufactured as follows: A base structure of a certain shape of a sponge or other porous structural body is impregnated with a slurry containing a carbon-supplying resin and a silicon powder. The impregnated base structure is carbonized at 900° C. to 1300° C. in an inert atmosphere. The structure is then reaction sintered at 1300° C. or beyond in vacuum or in an inert atmosphere to produce silicon carbide possessing good wettability with molten silicon. Simultaneously with this, pores form due to volume decreasing reactions. Finally, the porous structural body is impregnated with molten silicon at 1300° C. to 1800° C. in vacuum or in an inert atmosphere. The resultant porous material has few cell-forming pores clogged by excess slurry. See Japanese Unexamined Patent Publication, or Tokukai, 2003-119085 published Apr. 23, 2003 which corresponds to Japanese Patent Applications, or Tokugan, 2001-238547 and 2001-248484.

Conventionally, no three-dimensional ceramic filters were intended to direct light therethrough. In addition, sponge-like porous structural bodies with no titanium oxide coating, like the above silicon carbide-based thermostable ultralightweight porous material, can decompose NOx gas at 254 nm (ultraviolet) only with poor results. At ultraviolet 365 nm, NOx gas concentration hardly falls. The use of an initial structural body as in the above case greatly facilitates the manufacture with complex shapes. The use also provides uniform cells and achieves a porosity 85 vol % or more, typically 90 vol % or more.

Therefore, for example, the sponge-like porous structural body (A) is readily available as follows, for example: An initial structural body (C) having a sponge-like base structure and thermally decomposing when carbonized is impregnated with a slurry containing a carbon-supplying resin and either or both of a silicon powder and a silicon alloy. After that, the initial structural body (C) is carbonized at 800° C. to 1300° C. in an inert atmosphere.

For example, the sponge-like porous structural body (A) may have a sponge-like base structure formed as follows: An initial structural body (C) is impregnated with a slurry containing a carbon-supplying resin and either or both of a silicon powder and a silicon alloy. The initial structural body (C) contains either a polymer compound or a natural fiber, thread or paper with a sponge-like base structure. After that, the impregnated initial structural body (C) is carbonized at 800° C. to 1300° C. in an inert atmosphere.

The initial structural body (C) may be a wavy, honeycomb, or other type of three-dimensional network structure made of a material thermally decomposing when carbonized. The structural body (C) is, for example, a sheet of wavelike molded paper with a sheet of thick paper attached to either one or two sides thereof. The structural body (C) may be a piece of corrugated cardboard.

According to the above method, a visible-light-responsive three-dimensional fine cell-structured photocatalytic filter (sponge-like porous structural body (A)) can be readily manufactured using a thermostable lightweight porous carbon-based composite material.

This sponge-like porous structural body (A) is manufactured as follows, for example: A sponge-like initial structural body (C) made of polyurethane or another polymer compound is impregnated with a slurry containing a phenolic resin, a furan resin, or a like resin and a silicon powder. Excess slurry is removed. The impregnated initial structural body (C) is then carbonized at 800° C. to 1300° C. in an inert atmosphere. A carbonized complex thus obtained contains no initial structural body (C), because it thermally decomposes. The complex therefore is a mixture of amorphous carbon where the resin has carbonized and the silicon powder. The resultant sponge-like porous structural body (A) is substantially identical to the sponge-like initial structural body (C). For these reasons, according to the arrangement, with the titanium oxide being fixed, it is ensured that light reaches the photocatalyst inside the sponge-like porous structural body (A), and photocatalytic action is effectively displayed. These effects are readily feasible from the arrangement. Amorphous carbon is electrically conductive. In addition, the addition of a silicon powder, for example, provides free silicon, which in turn facilitates an effective display of photocatalytic action under visible light.

The carbon and either or both of silicon and a silicon alloy (especially, silicon) in total account for preferably 40 vol % or more, more preferably 60 vol % or more, of the sponge-like porous structural body (A) because these components provide a core for the sponge base structure. It is desirable if the sponge-like porous structural body (A) primarily contains carbon and either or both of silicon and a silicon alloy (especially, silicon). These components may add up to 100 wt %. In other words, the sponge-like porous structural body (A) may be made up of, for example, carbon and either or both of silicon and a silicon alloy (especially, silicon). In addition, the silicon/carbon ratio is preferably 60 vol % or less, more preferably 40 vol % or less.

In addition, the sponge-like porous structural body (A) is more preferred if the sponge-like porous structure (B) has a sponge-like base structure with crosslinks which have an average thickness of 1 mm or less and contains silicon and carbon in a Si/C molar ratio of 0.1 to 2 (specifically, for example, 0.8, 1.0, etc.).

For these reasons, the present invention preferably meets the following conditions: The crosslinks of the sponge-like base structure of the initial structural body (C) are 1 mm thick or less on average. The silicon powder and/or the silicon alloy are/is used (mixed) in such amount(s) to achieve a Si/C molar ratio of 0.1 to 2 with the composition. The shape of the initial structural body (C) is retained in the sponge-like porous structural body (A).

In other words, the slurry may have any suitable composition that satisfies these conditions. The composition is not limited in any particular manner. If the slurry concentration is too high, however, film may form in cell parts; on the other hand, if the slurry concentration is too low, the slurry (liquid) may drop when it dries. The concentration is preferably specified to a suitable value in view of these problems in accordance with components involved and other requirements.

Take a slurry containing a phenolic resin and a dispersion medium (for example, ethanol) as an example. The concentration in terms of weight of such a slurry is preferably regulated at about 35 wt %, because the slurry will have suitable for adhesion to the initial structural body (C).

The dispersion medium for the slurry is, for example, ethanol or methanol. The dispersion medium is however not limited in any particular manner. Ethanol and methanol each makes a desirable dispersion medium for its high solubility in a phenolic resin.

When the crosslinks of the sponge-like base structure are 1 mm thick or less on average, and the Si/C molar ratio of the silicon/carbon composition is from 0.1 to 2 as described above, the resultant sponge-like porous structural body (A) hardly differs from the initial structural body (C) in the thickness of the sponge-like base structure. The structural body (A) can thus retain the shape of the sponge-like base structure. This means that a three-dimensional fine cell-structured photocatalytic filter with a complex shape can be readily manufactured. The resultant three-dimensional fine cell-structured photocatalytic filter has uniform cells and achieves a porosity 85 vol % or more (typically 90 vol % or more) and a bulk density of $0.3 \text{ g/cm}^3$ or less (typically $0.2 \text{ g/cm}^3$ or less). The filter is also optically transparent and functions under visible light. The bulk density is preferably $0.3 \text{ g/cm}^3$ or less (i.e. more than 0 and not more than $0.3 \text{ g/cm}^3$), more preferably $0.2 \text{ g/cm}^3$ or less. In the present invention, the bulk density of the resultant filter is not limited in any particular manner in terms of minimum value. Considering the bulk density of the sponge-like porous structural body (A), however, the bulk density of the resultant filter is preferably $0.05 \text{ g/cm}^3$ or more. The porosity is not limited in any particular manner in terms of maximum value (although it never goes up to 100 vol %). Preferably, the porosity is 98 vol % or less.

Likewise, consider the visible-light-responsive three-dimensional fine cell-structured photocatalytic filter in which the sponge-like porous structural body (A) is composed of (b) silicon carbide and at least one material selected from the group consisting of silicon, a silicon alloy, and carbon. This photocatalytic filter is readily manufactured by: immersing, in a solution containing or generating titanium oxide, a sponge-like porous structural body (A) containing silicon carbide and at least one material selected from the group consisting of silicon, a silicon alloy, and carbon and having a porosity of 85 vol % or more; drying the immersed structural body (A); and thereafter firing the dried structural body (A) at 100° C. to 800° C. in an oxidizing atmosphere.

Put differently, this visible-light-responsive three-dimensional fine cell-structured photocatalytic filter has a sponge-like porous structure (B) having a surface on which a titanium oxide coating is provided. The sponge-like porous structure (B) is prepared by: immersing, in a solution containing or generating titanium oxide, a sponge-like porous structural body (A) containing silicon carbide and at least one material selected from the group consisting of silicon, a silicon alloy, and carbon and having a porosity of 85 vol % or more; drying the immersed structural body (A); and thereafter firing the dried structural body (A) at 100° C. to 800° C. in an oxidizing atmosphere.

The visible-light-responsive three-dimensional fine cell-structured photocatalytic filter has similar numerous fine cells interconnected by crosslinks (three-dimensional netlike base structure). The sponge-like porous structural body (A) contains silicon carbide and at least one material selected from the group consisting of silicon, a silicon alloy, and carbon and has a porosity 85 vol % or more. The filter therefore readily holds a photocatalyst and allows simple control of light shining on the photocatalyst. Also, the filter has a high optical transmittance and shows an increased retain ratio for titanium oxide. The filter is made of, for example, silicon carbide and silicon, thereby containing free silicon; the filter exhibits effective photocatalytic action under visible light.

The sponge-like porous structural body (A) exhibits photocatalytic action under visible light when it contains only carbon (i.e. the structural body (A) is neither (b) silicon carbide and at least one material selected from the group consisting of silicon, a silicon alloy, and carbon nor (a) carbon and either or both of silicon and a silicon alloy). However, as mentioned earlier, containing free silicon enables the structural body (A) to exhibit photocatalytic action under visible light more effectively.

As in the previous cases the structural body (A) exhibits highly efficient photocatalytic action, as described above, due to the titanium oxide fired at 100° C. to 800° C. in an oxidizing atmosphere. Further, the visible-light-responsive three-dimensional fine cell-structured photocatalytic filter is also readily manufacturable.

If, for example, a three-dimensional ceramic filter prepared by sintering from a silicon carbide powder is used as the sponge-like porous structural body (A), the average thickness of crosslinks in the sponge-like base structure (average thickness of the base structure) may grow excessively, reducing porosity, and excess slurry may remain and clog pores where cells will form. These phenomena do not occur either with the case under consideration which provides sufficiently photocatalytic action under visible light, such as a fluorescent lamp.

The sponge-like porous structural body (A) is readily available as follows, for example: An initial structural body (C) having a sponge-like base structure and thermally decomposing when carbonized is impregnated with a slurry containing a carbon-supplying resin and either or both of a silicon powder and a silicon alloy. After that, the initial structural body (C) is carbonized at 800° C. to 1300° C. in an inert atmosphere and then reaction sintered at 1300° C. or above.

The sponge-like porous structural body (A) may be a sintered compact obtained in the reaction sintering which is at 1300° C. to 1800° C. impregnated with silicon and/or a silicon alloy that is/are melted prior to the impregnation.

Put differently, the sponge-like porous structural body (A) may be prepared as follows, for example: An initial structural body (C) having a sponge-like base structure and thermally decomposing when carbonized is impregnated with a slurry containing a carbon-supplying resin and either or both of a silicon powder and/or a silicon alloy. After that, the initial structural body (C) is carbonized at 800° C. to 1300° C. in an inert atmosphere and then reaction sintered at 1300° C. or above. A resulting sintered compact, obtained in the reaction sintering, is at 1300° C. to 1800° C. impregnated with silicon and/or a silicon alloy that is/are melted prior to the impregnation. Examples of the initial structural body (C) are already given in the above.

Put differently, the sponge-like porous structural body (A) may have, for example, a sponge-like base structure prepared as follows: An initial structural body (C) containing either a polymer compound or a natural fiber, thread or paper with a sponge-like base structure is impregnated with a slurry containing a carbon-supplying resin and either or both of a silicon powder and a silicon alloy. Thereafter, the initial structural body (C) is carbonized at 800° C. to 1300° C. in an inert atmosphere and then reaction sintered at 1300° C. or above. If necessary, a resulting sintered compact, obtained in the reaction sintering, is at 1300° C. to 1800° C. impregnated with silicon and/or a silicon alloy that is melted prior to the impregnation.

Accordingly, a visible-light-responsive three-dimensional fine cell-structured photocatalytic filter (sponge-like porous structural body (A)) can be readily manufactured using a thermostable lightweight porous composite carbon material.

This sponge-like porous structural body (A) is manufactured as follows, for example: A sponge-like initial structural body (C) made of polyurethane or another polymer compound is first impregnated with a slurry containing a silicon powder and a phenolic resin, a furan resin, or a like resin. Excess slurry is removed. The impregnated initial structural body (C) is then carbonized at 800° C. to 1300° C. in an inert atmosphere. To accelerate the thermal decomposition of organic materials, the carbonization is preferably done at 900° C. to 1300° C. A carbonized complex thus obtained contains no sponge-like initial structural body (C), because it thermally decomposes. The complex therefore is a mixture of carbon (carbonized resin) and the silicon powder. Next, this carbonized complex is reaction sintered at 1300° C. or beyond to produce porous silicon carbide possessing good wettability with molten silicon. This silicon carbide is, if necessary, impregnated with molten silicon at 1300° C. to 1800° C. The resultant sponge-like porous structural body (A) is substantially identical to the sponge-like initial structural body.

Specifically, a sponge is soaked in a slurry containing a mixture of, for example, a phenolic resin, a silicon powder, and ethanol. The sponge is squeezed to sufficiently remove excess slurry and dried for 12 hours at 70° C. The sponge is carbonized at 800° C. to 1300° C., preferably at 900° C. to 1300° C., in an inert atmosphere. The sponge is fired further at an elevated temperature in an inert atmosphere, for example, in argon. In the firing, the silicon powder reacts with the carbon in the phenolic resin to produce silicon carbide. For these reasons, the carbon, the silicon, and the silicon carbide start to coexist at about 1300° C. to 1320° C., for example. At about 1400° C. to 1450° C., for example, the silicon carbide is present in excess of the carbon and silicon, although those temperatures may vary depending on the amounts (mix ratio) of the carbon-supplying phenolic resin and the silicon powder involved. Under these conditions, if there is provided relatively much carbon (for example, Si/C<1 in moles), a mixture of a sponge-shaped carbon structure and silicon carbide is obtained. If there is provided relatively less carbon (for example, Si/C>1 in moles), a mixture of a sponge-shaped silicon carbide structure and silicon is obtained. If Si/C=1, only silicon carbide is obtained.

For these reasons, the resultant sponge-like porous structural body (A) contains either silicon and/or the silicon alloy in addition to the foregoing components and is substantially identical to the sponge-like initial structural body. The structural body (A) is obtained by, when necessary, impregnating the silicon carbide obtained in the reaction sintering with molten silicon and/or a molten silicon alloy at 1300° C. to 1800° C.

According to the arrangement, with the titanium oxide being fixed, it is ensured that light reaches the photocatalyst inside the sponge-like porous structural body (A), and photocatalytic action is effectively exhibited. These effects are readily feasible from the arrangement. Like in the previous cases, the presence of free silicon facilitates an effective display of photocatalytic action under visible light.

The silicon carbide and the at least one material selected from the group consisting of silicon, a silicon alloy, and carbon (especially, silicon) in total account for preferably 40 vol % or more, more preferably 60 vol % or more, of the sponge-like porous structural body (A) because these components provide a core for the sponge base structure. It is desirable if the sponge-like porous structural body (A) primarily contains silicon carbide and at least one material selected from the group consisting of silicon, a silicon alloy, and carbon (especially, silicon). These components may add up to 100 wt %. In other words, the sponge-like porous structural body (A) may be made up of, for example, silicon carbide and at least one material selected from the group consisting of silicon, a silicon alloy, and carbon (e.g., silicon carbide and carbon as described above, or silicon and/or a silicon alloy). In addition, as described above, the sponge-like porous structural body (A) may be silicon carbide and either or both of silicon and a silicon alloy. The silicon and/or the silicon alloy may be melted for the impregnation with a sponge-like base structure containing silicon carbide and carbon, a sponge-like base structure containing silicon carbide, or a sponge-like base structure containing silicon carbide and either or both of silicon and a silicon alloy.

In addition, in this case, it is preferable if in the sponge-like porous structural body (A), the crosslinks of the sponge-like base structure in the sponge-like porous structure (B) on average measure 1 mm or less in thickness, and for example, the Si/SiC molar ratio of the silicon/silicon carbide composition is from 0.1 to 2. Where the sponge-like porous structural body (A) is prepared involving impregnation with molten silicon and/or a molten silicon alloy, it is more preferable if the crosslinks of the sponge-like base structure in the sponge-like porous structure (B) on average measure 1 mm or less in thickness, and for example, the Si/SiC molar ratio of the silicon/silicon carbide composition is from 0.1 to 4.

For these reasons, it is preferred in the present invention to limit the average thickness of the crosslinks of the sponge-like base structure in the initial structural body (C) to 1 mm or less and to use (mix) silicon and/or a silicon alloy so that the silicon/silicon carbide composition has a Si/SiC molar ratio of 0.1 to 2, so as to obtain a sponge-like porous structural body (A) which retains the shape of the initial structural body (C). For example, a silicon powder and/or a silicon alloy is/are used (mixed) so that the silicon/carbon composition has a Si/C molar ratio of 0.1 to 2. Where the sponge-like porous structural body (A) is prepared involving impregnation with molten silicon and/or a molten silicon alloy, it is more preferred to limit the average thickness of the crosslinks of the sponge-like base structure in the initial structural body (C) to 1 mm or less and to impregnate with silicon and/or a silicon alloy so that the silicon/silicon carbide composition has a Si/SiC molar ratio of 0.1 to 4 or the silicon/carbon composition has a Si/C molar ratio of 0.1 to 4, so as to obtain a sponge-like porous structural body (A) which retains the shape of the initial structural body (C).

The slurry may have any suitable composition that satisfies these conditions. The composition is not limited in any particular manner. The slurry is preferably specified to a suitable concentration for adhesion to the initial structural body (C) in accordance with components involved and other requirements as in the previous cases. Take a slurry containing a phenolic resin and a dispersion medium (for example, ethanol) as an example. The concentration in terms of weight of such a slurry is preferably regulated at about 35 wt %. Examples of the dispersion medium for the slurry in this case are, for example, the same as those listed in the previous cases.

When the crosslinks of the sponge-like base structure are 1 mm thick or less on average, and the Si/SiC molar ratio of the silicon/silicon carbide composition is 0.1 to 2 (or 0.1 to 4 if the melt-impregnation is involved) as described above, the resultant sponge-like porous structural body (A) hardly differs from the initial structural body (C) in the thickness of the sponge-like base structure. The structural body (A) can thus retain the shape of the sponge-like base structure. This means that a three-dimensional fine cell-structured photocatalytic filter with a complex shape can be readily manufactured. As in the previous cases, the resultant three-dimensional fine cell-structured photocatalytic filter has uniform cells and achieves a porosity 85 vol % or more (typically 90 vol % or more) and a bulk density of 0.3 g/cm$^3$ or less (typically 0.2 g/cm$^3$ or less). The filter is also optically transparent and functions under visible light.

The silicon alloy preferably contains at least one material selected from the group consisting of magnesium, aluminum, titanium, chromium, manganese, iron, cobalt, nickel, copper, zinc, zirconium, niobium, molybdenum, and tungsten. If the slurry contains, for example, the silicon alloy or a mixture of these silicon alloys and a silicon powder, the slurry can be easily used in, for example, the melt-impregnation of the sintered compact with silicon. This means that the sponge-like base structure can be readily formed.

In the aforementioned reaction, the initial structural body (C) impregnated with a slurry containing a carbon-supplying resin and either or both of a silicon powder and a silicon alloy is carbonized in an inert atmosphere, to produce the sponge-like porous structural body (A) containing (b) silicon carbide and at least one material selected from the group consisting of silicon, a silicon alloy, and carbon. If the carbonization is done in a nitrogen gas atmosphere, the resultant sponge-like porous structural body (A) contains silicon nitride due to nitriding reaction of the silicon.

Put differently, the visible-light-responsive three-dimensional fine cell-structured photocatalytic filter in which the sponge-like porous structural body (A) is composed of (c) silicon nitride carbon and at least one material selected from the group consisting of silicon, a silicon alloy, carbon, and silicon carbide is readily manufactured by: immersing, in a solution containing or generating titanium oxide, a sponge-like porous structural body (A) containing silicon nitride and at least one material selected from the group consisting of silicon, a silicon alloy, carbon, and silicon carbide and having a porosity of 85 vol % or more; drying the immersed structural body (A); and thereafter firing the dried structural body (A) at 100° C. to 500° C. in an oxidizing atmosphere.

Put differently, this visible-light-responsive three-dimensional fine cell-structured photocatalytic filter contains the sponge-like porous structure (B) having a surface on which a titanium oxide coating is provided. The sponge-like porous structure (B) is prepared by: immersing, in a solution containing or generating titanium oxide, a sponge-like porous structural body (A) containing silicon nitride and at least one material selected from the group consisting of silicon, a silicon alloy, carbon, and silicon carbide and having a porosity of 85 vol % or more; drying the immersed structural body (A); and thereafter firing the dried structural body (A) at 100° C. to 800° C. in an oxidizing atmosphere.

According to the arrangement, the sponge-like porous structural body (A) contains silicon nitride and at least one material selected from the group consisting of silicon, a silicon alloy, carbon, and silicon carbide and has a porosity 85% or more. The visible-light-responsive three-dimensional fine cell-structured photocatalytic filter therefore, as in the previous cases, readily holds a photocatalyst and allows simple control of light shining on the photocatalyst. Also, the filter has a high optical transmittance and shows an increased retain ratio for titanium oxide. In addition, the sponge-like porous structural body (A) is electrically conductive because of the inclusion of, for example, carbon, and effectively exhibits photocatalytic action under visible light. The carbon is preferably amorphous for excellent mechanical strength. Such a carbon is available by carbonizing resin, for example. As in the previous cases, the structural body (A) exhibits highly efficient photocatalytic action, as described above, due to the titanium oxide fired at 100° C. to 800° C. in an oxidizing atmosphere. Further, the visible-light-responsive three-dimensional fine cell-structured photocatalytic filter is also readily manufacturable.

If, for example, a three-dimensional ceramic filter prepared by sintering from a silicon carbide powder is used as the sponge-like porous structural body (A), the average thickness of crosslinks in the sponge-like base structure (average thickness of the base structure) may grow excessively, reducing porosity, and excess slurry may remain and clog pores where cells will form. These phenomena do not occur either with the case under consideration which provides sufficiently photocatalytic action under visible light, such as a fluorescent lamp.

The sponge-like porous structural body (A) is readily available as follows, for example. An initial structural body (C) having a sponge-like base structure and thermally decomposing when carbonized is impregnated with a slurry containing a carbon-supplying resin and either or both of a silicon powder and a silicon alloy. After that, the initial structural body (C) is heat processed at 800° C. to 1500° C. in a nitrogen atmosphere (fired in an nitrogen atmosphere) for carbonization and a nitriding reaction of silicon.

Put differently, the sponge-like porous structural body (A) may have, for example, a sponge-like base structure prepared as follows: An initial structural body (C) containing either a polymer compound or a natural fiber, thread or paper with a sponge-like base structure is impregnated with a slurry containing a carbon-supplying resin and either or both of a silicon powder and a silicon alloy. Thereafter, the initial structural body (C) is heat processed at 800° C. to 1500° C. in a nitrogen atmosphere for carbonization and a nitriding reaction of silicon.

Accordingly, a visible-light-responsive three-dimensional fine cell-structured photocatalytic filter (sponge-like porous structural body (A)) can be readily manufactured using a thermostable lightweight porous composite carbon material.

This sponge-like porous structural body (A) is manufactured as follows, for example: A sponge is first impregnated with a slurry which is a mixture of a phenolic resin, a silicon powder, and ethanol. The sponge is squeezed to sufficiently remove excess slurry and dried for 12 hours at 70° C. The sponge is heated, for example, to 1500° C. and carbonized at 800° C. to 1500° C. in a nitrogen atmosphere. Under these conditions, the carbonization starts first, which is followed by a nitriding reaction of silicon at 1100° C. or beyond, to produce silicon nitride ($Si_3N_4$). Silicon carbide can also form depending on reaction time. As in the previous cases, the resultant sponge-like porous structural body (A) can have a different composition depending on the carbon/silicon molar ratio and reaction time (reaction speed). For example, as mentioned above, if relatively much carbon is involved, the carbon partly remains, and a mixture of a sponge-shaped carbon structure, silicon nitride, and silicon carbide is obtained. The nitriding reaction ($Si_3N_4$) of silicon is far slower than the carbonizing reaction (SiC) of silicon. For these reasons, after the phenolic resin and the silicon powder have carbonized, the heating process is continued for further nitriding reaction in a nitrogen atmosphere, so as to obtain a sponge-like porous structural body (A) containing silicon nitride.

As in the previous cases, there is no sponge-like initial structural body (C) included, because it thermally decomposes. As a result, the obtained sponge-like porous structural body (A) has a substantially identical shape to the sponge-like initial structural body (C). For these reasons, as in the previous arrangements, with the titanium oxide being fixed, it is ensured that light reaches the photocatalyst inside the sponge-like porous structural body (A), and photocatalytic action is effectively displayed. These effects are readily feasible from the arrangement.

The silicon nitride and at least one material selected from the group consisting of silicon, a silicon alloy, carbon, and silicon carbide (especially, silicon) in total account for preferably 40 vol % or more, more preferably 60 vol % or more, of the sponge-like porous structural body (A) because these components provide a core for the sponge base structure. It is desirable if the sponge-like porous structural body (A) primarily contains silicon nitride and at least one material selected from the group consisting of silicon, a silicon alloy, carbon, and silicon carbide (especially, silicon). These components may add up to 100 wt %. In other words, the sponge-like porous structural body (A) may be made up of, for example, silicon nitride and at least one material selected from the group consisting of silicon, a silicon alloy, carbon, and silicon carbide. For example, as described above, the structural body (A) may be made up of silicon nitride and silicon carbide; silicon nitride and silicon carbide; or silicon nitride and either or both of silicon and a silicon alloy.

According to the present invention, as described above, the composition of the sponge-like porous structural body (A) may be changed in a given way by means of difference in reaction speed between the nitriding and carbonizing reactions of silicon. It is preferred to limit the average thickness of the crosslinks of the sponge-like base structure in the initial structural body (C) to 1 mm or less and to use (mix) a silicon powder and/or a silicon alloy so that the silicon/carbon composition has a Si/C molar ratio of 0.1 to 2, so as to obtain a sponge-like porous structural body (A) which retains the shape of the initial structural body (C).

As in the previous cases, the slurry may have any suitable composition that satisfies these conditions. The composition is not limited in any particular manner. In other words, as in the previous cases, the slurry is preferably specified to a suitable concentration for adhesion to the initial structural body (C) in accordance with components involved and other requirements as described above. Take the weight ratio of a phenolic resin and a dispersion medium (for example, ethanol). The concentration is preferably regulated at about 35 wt %, for example. Examples of the dispersion medium for the slurry in this case are, for example, the same as those listed in the previous cases.

As described above, by using (mixing) a carbon-supplying resin and either or both of silicon and silicon metal so that the crosslinks of the sponge-like base structure is 1 mm thickness or less on average and that silicon/carbon composition has a Si/C molar ratio of 0.1 to 2, the resultant sponge-like porous structural body (A) hardly differs from the initial structural body (C) in the thickness of the sponge-like base structure. The structural body (A) can thus retain the shape of the sponge-like base structure. This means that a three-dimensional fine cell-structured photocatalytic filter with a complex shape can be readily manufactured. As in the previous cases, the resultant three-dimensional fine cell-structured photocatalytic filter has uniform cells and achieves a porosity 85 vol % or more (typically 90 vol % or more) and a bulk density of 0.3 g/cm$^3$ or less (typically 0.2 g/cm$^3$ or less). The filter is also optically transparent and functions under visible light.

In addition, the visible-light-responsive three-dimensional fine cell-structured photocatalytic filter in which the sponge-like porous structural body (A) is composed of (d) carbon is readily manufactured by: immersing, in a solution containing or generating titanium oxide, a sponge-like porous structural body (A) containing carbon and having a porosity of 85 vol % or more; drying the immersed structural body (A); and thereafter firing the dried structural body (A) at 100° C. to 500° C. in an oxidizing atmosphere.

Put differently, this visible-light-responsive three-dimensional fine cell-structured photocatalytic filter contains the sponge-like porous structure (B) having a surface on which a titanium oxide coating is provided. The sponge-like porous structure (B) is prepared by: immersing, in a solution containing or generating titanium oxide, a sponge-like porous structural body (A) containing carbon and having a porosity of 85 vol % or more; drying the immersed structural body (A); and thereafter firing the dried structural body (A) at 100° C. to 500° C. in an oxidizing atmosphere.

According to the arrangement, the sponge-like porous structural body (A) contains carbon and has a porosity 85% or more. The visible-light-responsive three-dimensional fine cell-structured photocatalytic filter therefore, as in the previous cases, readily holds a photocatalyst and allows simple control of light shining on the photocatalyst. Also, the filter has a high optical transmittance and shows an increased retain ratio for titanium oxide. In addition, the sponge-like porous structural body (A) is electrically conductive because of the inclusion of carbon, and effectively exhibits photocatalytic action under visible light. The carbon is preferably amorphous for excellent mechanical strength. Such a carbon is available by carbonizing resin, for example. The structural body (A) exhibits highly efficient photocatalytic action due to the titanium oxide fired at 100° C. to 500° C. in an oxidizing atmosphere. Further, the visible-light-responsive three-dimensional fine cell-structured photocatalytic filter is also readily manufacturable. The titanium oxide is fired at 100° C. to 500° C. in the arrangement for the following reasons: As described above, if fired below 100° C., the titanium oxide is retained only insufficiently. If fired beyond 500° C., carbon oxidation starts. However, as described above, if the titanium oxide is fired quickly at 500° C. or beyond in an oxidizing atmosphere, the carbon dose not oxidize.

If, for example, a three-dimensional ceramic filter prepared by sintering from a silicon carbide powder is used as the sponge-like porous structural body (A), the average thickness of crosslinks in the sponge-like base structure (average thickness of the base structure) may grow excessively, reducing porosity, and excess slurry may remain and clog pores where cells will form. These phenomena do not occur either with the case under consideration which provides sufficiently photocatalytic action under visible light, such as a fluorescent lamp.

The sponge-like porous structural body (A) is readily available as follows, for example: An initial structural body (C)

having a sponge-like base structure and thermally decomposing when carbonized is impregnated with a slurry containing a carbon-supplying resin. After that, the initial structural body (C) is carbonized at 800° C. to 1300° C. in an inert atmosphere.

The sponge-like porous structural body (A) may have, for example, a sponge-like base structure prepared as follows: An initial structural body (C) containing either a polymer compound or a natural fiber, thread or paper with a sponge-like base structure is impregnated with a slurry containing a carbon-supplying resin. Thereafter, the initial structural body (C) is carbonized at 800° C. to 1300° C. in an inert atmosphere.

Accordingly, a visible-light-responsive three-dimensional fine cell-structured photocatalytic filter (sponge-like porous structural body (A)) can be readily manufactured using a thermostable lightweight porous composite carbon material.

This sponge-like porous structural body (A) is manufactured as follows, for example: A sponge-like initial structural body (C) made of polyurethane or another polymer compound is impregnated with a slurry containing a phenolic resin, a furan resin, or a like resin. Excess slurry is removed. The impregnated initial structural body (C) is then carbonized at 800° C. to 1300° C. in an inert atmosphere. As in the previous cases, there is no initial structural body (C) included, because it thermally decomposes. As a result, an amorphous carbon structure is obtained in which resin is carbonized. The obtained sponge-like porous structural body has a substantially identical shape to the sponge-like initial structural body (C). For these reasons, according to the arrangement, with the titanium oxide being fixed, it is ensured that light reaches the photocatalyst inside the sponge-like porous structural body (A), and photocatalytic action is effectively displayed. These effects are readily feasible from the arrangement.

Carbon accounts for preferably 40 vol % or more, more preferably 60 vol % or more, and most preferably 70 vol % or more, of the sponge-like porous structural body (A) because the carbon provides a core for the base structure interconnecting powder. It is desirable if the sponge-like porous structural body (A) primarily contains carbon. Alternatively, the structural body (A) is made of solely of carbon.

As in the previous cases, the slurry may have any suitable composition that satisfies these conditions. The composition is not limited in any particular manner. In other words, as in the previous cases, the slurry is preferably specified to a suitable concentration for adhesion to the initial structural body (C) in accordance with components involved and other requirements as described above. Take the weight ratio of a phenolic resin and a dispersion medium (for example, ethanol). The concentration is preferably regulated at about 35 wt %, for example. Examples of the dispersion medium for the slurry in this case are, for example, the same as those listed in the previous cases.

In addition, the visible-light-responsive three-dimensional fine cell-structured photocatalytic filter in which the sponge-like porous structural body (A) is composed of (e) carbon and one metal selected from the group consisting of titanium, vanadium, chromium, manganese, iron, cobalt, nickel, copper, ruthenium, rhodium, palladium, silver, platinum, and gold is readily manufactured by: immersing, in a solution containing or generating titanium oxide, a sponge-like porous structural body (A) containing carbon and one metal selected from the group consisting of titanium, vanadium, chromium, manganese, iron, cobalt, nickel, copper, ruthenium, rhodium, palladium, silver, platinum, and gold and having a porosity of 85 vol % or more; drying the immersed structural body (A); and thereafter firing the dried structural body (A) at 100° C. to 500° C. in an oxidizing atmosphere.

Put differently, this visible-light-responsive three-dimensional fine cell-structured photocatalytic filter contains the sponge-like porous structure (B) having a surface on which a titanium oxide coating is provided. The sponge-like porous structure (B) is prepared by: immersing, in a solution containing or generating titanium oxide, a sponge-like porous structural body (A) containing carbon and one metal selected from the group consisting of titanium, vanadium, chromium, manganese, iron, cobalt, nickel, copper, ruthenium, rhodium, palladium, silver, platinum, and gold and having a porosity of 85 vol % or more; drying the immersed structural body (A), and thereafter firing the dried structural body (A) at 100° C. to 500° C. in an oxidizing atmosphere.

According to the arrangement, the sponge-like porous structural body (A) contains carbon and that one metal and has a porosity 85% or more. The visible-light-responsive three-dimensional fine cell-structured photocatalytic filter therefore, as in the previous cases, readily holds a photocatalyst and allows simple control of light shining on the photocatalyst. Also, the filter has a high optical transmittance and shows an increased retain ratio for titanium oxide. In addition, the sponge-like porous structural body (A) is electrically conductive because of the inclusion of, for example, carbon and the metal, and effectively exhibits photocatalytic action under visible light. The carbon is preferably amorphous for excellent mechanical strength. Such a carbon is available by carbonizing resin, for example. The structural body (A) is exhibits highly efficient photocatalytic action due to the titanium oxide fired at 100° C. to 500° C. in an oxidizing atmosphere. Further, the visible-light-responsive three-dimensional fine cell-structured photocatalytic filter is also readily manufacturable. The titanium oxide is fired at 100° C. to 500° C. in the arrangement for the reasons stated above. However, as in the previous cases, as described above, if the titanium oxide is fired quickly at 500° C. or beyond in an oxidizing atmosphere, the carbon does not oxidize.

If, for example, a three-dimensional ceramic filter prepared by sintering from a silicon carbide powder is used as the sponge-like porous structural body (A), the average thickness of crosslinks in the sponge-like base structure (average thickness of the base structure) may grow excessively, reducing porosity, and excess slurry may remain and clog pores where cells will form. These phenomena do not occur either with the case under consideration which provides sufficiently photocatalytic action under visible light, such as a fluorescent lamp.

The sponge-like porous structural body (A) is readily available as follows, for example: An initial structural body (C) having a sponge-like base structure and thermally decomposing when carbonized is impregnated with a slurry containing a carbon-supplying resin and a powder of one metal selected from the group consisting of titanium, vanadium, chromium, manganese, iron, cobalt, nickel, copper, ruthenium, rhodium, palladium, silver, platinum, and gold. After that, the initial structural body (C) is carbonized at 800° C. to 1300° C. in an inert atmosphere.

The sponge-like porous structural body (A) may have, for example, a sponge-like base structure prepared as follows: An initial structural body (C) containing either a polymer compound or a natural fiber, thread or paper with a sponge-like base structure is impregnated with a slurry containing a carbon-supplying resin and a powder of one metal selected from the group consisting of titanium, vanadium, chromium, manganese, iron, cobalt, nickel, copper, ruthenium, rhodium, palladium, silver, platinum, and gold. Thereafter, the initial structural body (C) is carbonized at 800° C. to 1300° C. in an inert atmosphere.

Accordingly, a visible-light-responsive three-dimensional fine cell-structured photocatalytic filter can be readily manufactured which is electrically conductive and effectively exhibits photocatalytic action under visible light.

The carbon and the metal in total account for preferably 40 vol % or more, more preferably 60 vol % or more, of the sponge-like porous structural body (A) because these components provide a core for the sponge base structure. It is desirable if the sponge-like porous structural body (A) primarily contains carbon and the metal. These components may add up to 100 wt %, In other words, the sponge-like porous structural body (A) may be made up, for example, carbon and the metal.

In addition, a metal(s) accounts for preferably 60 vol % or less, more preferably 30 vol % or less, of the sponge-like porous structural body (A) because the metal(s) is interconnected by the amorphous carbon derived from the carbon-supplying resin.

In this case, the sponge-like porous structural body (A) is preferably, for example, carbon and titanium. It is more preferably if the crosslinks of the sponge-like base structure in the sponge-like porous structure (B) are 1 mm thick or less on average and the metal/carbon molar ratio is 0.1 to 2 (especially, if the sponge-like porous structural body (A) contains carbon and titanium, the titanium/carbon composition has a Ti/C molar ratio of 0.1 to 2).

For these reasons, in the present invention, it is preferred to limit the crosslinks of the sponge-like base structure in the initial structural body (C) to 1 mm thick or less on average and achieve a metal/carbon molar ratio of 0.1 to 2 (especially, if the sponge-like porous structural body (A) contains carbon and titanium, titanium powder is added so that the titanium/carbon composition has a Ti/C molar ratio of 0.1 to 2), so as to obtain a sponge-like porous structural body (A) which retains the shape of the initial structural body (C).

As in the previous cases, the slurry may have any suitable composition that satisfies the conditions. The composition is not limited in any particular manner. In other words, as in the previous cases, the slurry is preferably specified to a suitable concentration for adhesion to the initial structural body (C) in accordance with components involved and other requirements as described above. Examples of the dispersion medium for the slurry in this case are, for example, the same as those listed in the previous cases.

In this case, the titanium powder is preferably hydrogenated titanium powder to avoid surface oxidation.

As described above, when the crosslinks of the sponge-like base structure are 1 mm thick or less on average, and the metal, e.g. titanium, and carbon composition has a Ti/C molar ratio of 0.1 to 2, the resultant sponge-like porous structural body (A) hardly differs from the initial structural body (C) in the thickness of the sponge-like base structure. The structural body (A) can thus retain the shape of the sponge-like base structure. This means that a three-dimensional fine cell-structured photocatalytic filter with a complex shape can be readily manufactured. As in the previous cases, the resultant three-dimensional fine cell-structured photocatalytic filter has uniform cells and achieves a porosity 85 vol % or more (typically 90 vol % or more) and a bulk density of 0.3 g/cm$^3$ or less (typically 0.2 g/cm$^3$ or less). The filter is also optically transparent and functions under visible light.

In the present invention, each slurry mentioned above may further contain at least one powder selected from the group consisting of silicon carbide, silicon nitride, boron carbide, alumina, silica, mullite, and zirconia. In other words, in the present invention, each sponge-like porous structural body (A) mentioned above may further contain one, two, or more components derived from these powders (ceramic powders), such as silicon carbide, silicon nitride, boron carbide, alumina, silica, mullite, and zirconia, in addition to those components listed in (a) to (e) as examples.

This addition of a ceramic powder(s) reduces the shrinkage of the sponge in carbonization firing, adding to surface area. The ceramic powder(s) may be mixed with the carbon-supplying resin, for example. It is preferable if the ceramic powder(s) is/are used in an amount not more than 50 vol % the carbon derived from the resin.

Additional objects, advantages and novel features of the invention will be set forth in part in the description which follows, and in part will become apparent to those skilled in the art upon examination of the following or may be learned by practice of the invention.

BEST MODE FOR CARRYING OUT THE INVENTION

Figure 1:
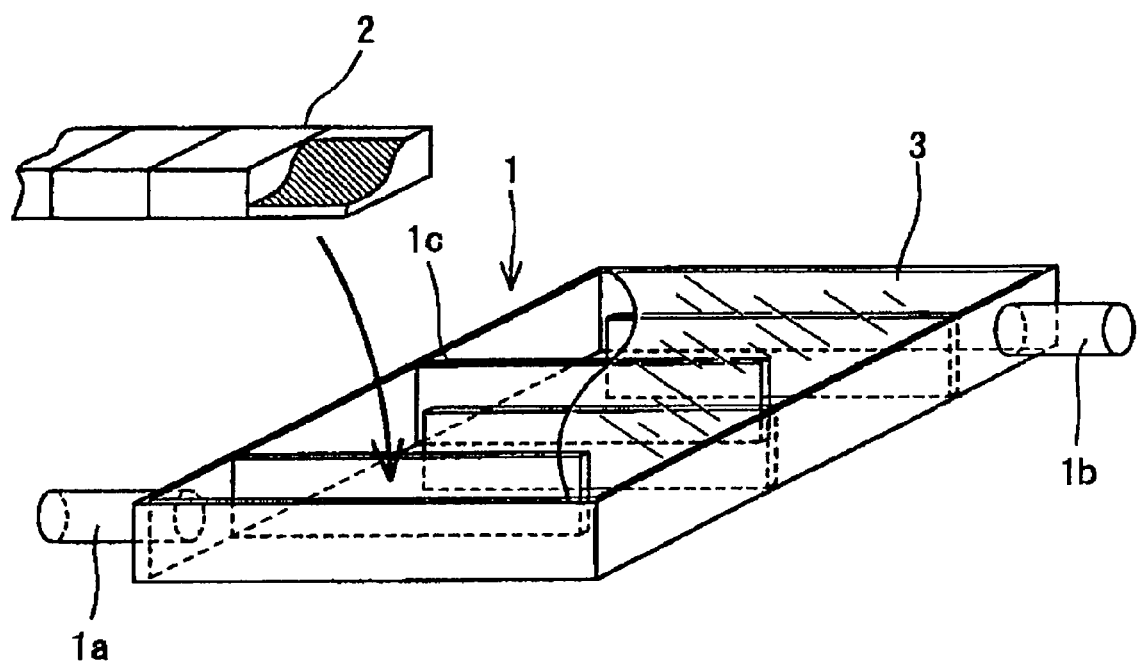
FIG. 1 is a cross-sectional view of a purifier device equipped with an optically transparent window in accordance with an embodiment of the present invention.

Now, we will discuss the present invention in more detail by way of examples and comparative examples that are by no means meant to be limiting the present invention.

In the following examples and comparative examples, the bulk density was calculated based on volume and weight measurements. The porosity was calculated from the bulk density and the true density. The adhesion weight of titanium oxide was obtained from weight measurements before and after the adhesion. The specific surface area was measured by nitrogen gas adsorption.

EXAMPLE 1

First, a polyurethane sponge-like initial structural body was immersed in a slurry. The initial structural body, shaped like a plate, was about 10 mm×50 mm×50 mm. The crosslinks of its sponge-like base structure were about 0.2 mm thick. Its cell count was about 13 cells per 25 mm. The slurry was a mixture of a carbon-supplying phenolic resin and a silicon powder with ethanol at Si/C=0.8 in moles. Next, with excess slurry having been removed, the sponge-like initial structural body was fired for an hour at 1000° C. in an argon atmosphere to carbonize it. The carbonized sponge-like initial structural body was heated in vacuum to 1450° C. for reaction sintering. The resulting sintered compact was simultaneously infiltrated with molten silicon weighing about 1.4 times the carbonized initial structural body, so as to form a sponge-like porous structural body.

The sponge-like porous structural body was immersed in a solution of a titanium oxide coating agent for photocatalytic purposes (Tayca Corporation; sold under the name "TKC-303"). After drying, the structural body was heated to 400° C. at a rate of 10° C. per minute in an oxidizing atmosphere, for example, in the air and maintained in those conditions for one hour. The structural body was then cooled down to room temperature, so as to fix titanium oxide onto the sponge-like porous structural body.

Table 1 shows the bulk density, porosity, weight of adhering titanium oxide, and optical transmittance of titanium oxide-coated sponge-like porous structural bodies in accordance with the present invention along with those of samples described in comparative examples (detailed later).

TABLE 1

|  | No. of Cells per 25 mm | Bulk Density (g/cm³) | Porosity (%) | Weight of Adhered TiO (g) | Transmittance (%) |
|---|---|---|---|---|---|
| Ex. 1 | 13 | 0.14 | 94.8 | 0.0893 | 5.23 |
| Ex. 2 | 18 | 0.17 | 93.7 | 0.4484 | 0.34 |

TABLE 1-continued

|  | No. of Cells per 25 mm | Bulk Density (g/cm³) | Porosity (%) | Weight of Adhered TiO (g) | Transmittance (%) |
|---|---|---|---|---|---|
| Comp. Ex. 1 | 6 | 0.55 | 83.0 | 0.1361 | 5.06 |
| Comp. Ex. 2 | 13 | 0.57 | 82.1 | 0.2293 | 0.17 |

The titanium oxide-coated sponge-like porous structural body of the present example thus prepared had a molar SiC/Si ratio of about 1:1 and was shaped like plate of about 10 mm×50 mm×50 mm. Further, as shown in Table 1, the structural body had a bulk density of 0.14 g/cm³, a porosity of 94.8 vol %, and a specific surface area of about 0.1 m²/g.

This means that the titanium oxide-coated sponge-like porous structural body of example 1 was shaped like a plate of about 10 mm×50 mm×50 mm, retaining almost the same shape as the polyurethane sponge-like initial structural body. The thickness of the crosslinks was almost the same too. 0.0893 g of titanium oxide adhered.

Subsequently, the optical transmittance of an about 10-mm thick titanium oxide-coated sponge-like porous structural body was measured under 365 nm ultraviolet light. As shown in Table 1, the optical transmittance at 365 nm ultraviolet was 5.23 vol %.

Next, to compare the photocatalytic effect of titanium oxide-coated sponge-like porous structural bodies, the titanium oxide-coated sponge-like porous structural bodies were placed in a sealed container. Air containing an about 5-ppm NOx gas was passed at 500 mL/minute under light of a set of wavelengths. NOx gas concentrations were measured. Next, a NOx gas having the same concentration as this NOx gas concentration measurement after passing through the titanium oxide-coated sponge-like porous structural bodies was prepared. The same experiment was repeated five times to measure a NOx gas concentration. A greater reduction in the NOx gas concentration indicates that the titanium oxide-coated sponge-like porous structural body has a more powerful photocatalytic effect.

Table 2 was prepared to compare the photocatalytic action of titanium oxide-coated sponge-like porous structural bodies in terms of decomposition of NOx.

TABLE 2

| Sample No. |  |  | NOx gas concentration (ppm) No. of Passages | | | | | |
|---|---|---|---|---|---|---|---|---|
|  |  |  | 0 | 1 | 2 | 3 | 4 | 5 |
| 1 | Ex. 1 | * 254 nm | 4.98 | 3.83 | 2.88 | 2.10 | 1.41 | 0.91 |
| 2 | (400° C.) | * 365 nm | 5.02 | 3.06 | 1.72 | 0.89 | 0.34 | 0.00 |
| 3 |  | Fluorescence | 4.99 | 4.62 | 4.35 | 4.09 | 3.79 | 3.55 |
| 4 | Ex. 2 | * 254 nm | 4.99 | 3.52 | 2.36 | 1.63 | 1.08 | 0.56 |
| 5 | (400° C.) | * 365 nm | 5.01 | 2.76 | 1.37 | 0.61 | 0.17 | 0.00 |
| 6 |  | Fluorescence | 5.00 | 4.10 | 3.43 | 2.79 | 2.21 | 1.82 |
| 7 | Ex. 3 | * 254 nm | 4.95 | 4.47 | 4.04 | 3.62 | 3.20 | 2.79 |
| 8 | (600° C.) | * 365 nm | 4.97 | 3.85 | 2.91 | 2.13 | 1.51 | 0.99 |
| 9 |  | Fluorescence | 5.00 | 4.73 | 4.39 | 4.06 | 3.68 | 3.46 |
| 10 | Comp. | * 254 nm | 4.96 | 4.94 | 4.80 | 4.61 | 4.36 | 4.07 |
| 11 | Ex. 1 | * 365 nm | 4.96 | 4.89 | 4.81 | 4.71 | 4.73 | 4.73 |
| 12 | (400° C.) | Fluorescence | 5.03 | 4.90 | 4.96 | 4.96 | 4.96 | 4.96 |
| 13 | Comp. | * 254 nm | 4.99 | 4.79 | 4.56 | 4.34 | 4.08 | 3.86 |
| 14 | Ex. 2 | * 365 nm | 4.99 | 4.70 | 4.40 | 4.27 | 3.93 | 3.68 |
| 15 | (400° C.) | Fluorescence | 4.93 | 4.91 | 4.85 | 4.84 | 4.84 | 4.84 |

* Germicidal lamp for 254 nm, black-light lamp for 365 nm

Figure 2:
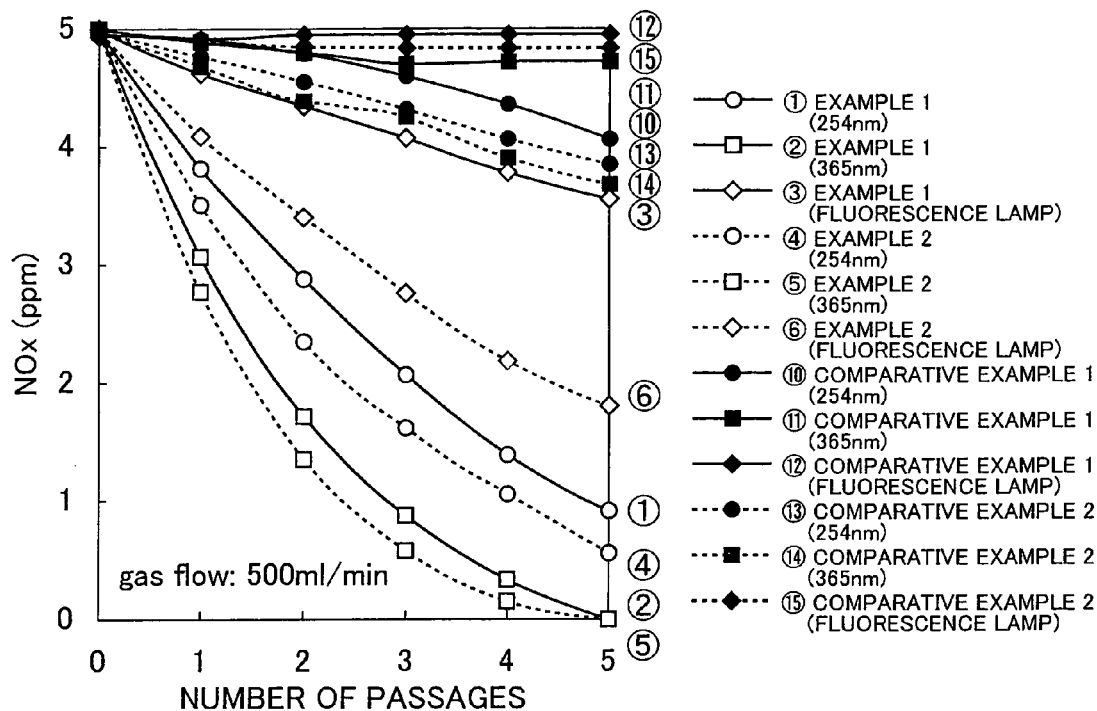
FIG. 2(a) is a graph depicting the photocatalytic action of titanium oxide-coated sponge-like porous structural bodies in accordance with the present invention in terms of decomposition of NOx.
FIG. 2(b) is another graph depicting the photocatalytic action of titanium oxide-coated sponge-like porous structural bodies in accordance with the present invention in terms of decomposition of NOx.
Figure 2:
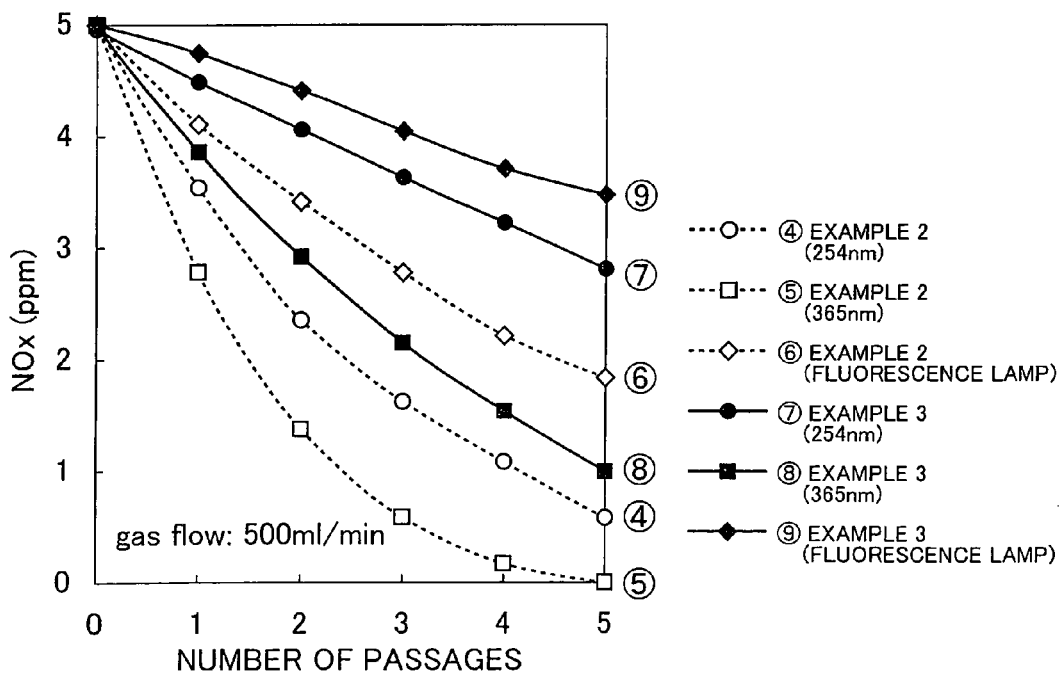

FIG. 2(*a*) and FIG. 2(*b*) show the photocatalytic action in Table 2. FIG. 2(*a*) is graphs representing the photocatalytic action of the titanium oxide-coated sponge-like porous structural bodies of examples 1, 2 and comparative examples 1, 2 in terms of decomposition of NOx. FIG. 2(*b*) is graphs representing the photocatalytic action of the titanium oxide-coated sponge-like porous structural bodies of examples 2, 3 in terms of decomposition of NOx. More specifically, FIG. 2(*a*) shows the photocatalytic effect of samples 1 to 6 and 10 to 15 in Table 2. FIG. 2(*b*) shows the photocatalytic effect of samples 4 to 9 in Table 2. In FIG. 2(*a*) and FIG. 2(*b*), sample numbers are encircled.

In Table 1 and Table 2, "example 1" indicates the titanium oxide-coated sponge-like porous structural body of example 1. Likewise, "example 2" indicates the titanium oxide-coated sponge-like porous structural body of example 2 (detailed later). "Example 3" indicates the titanium oxide-coated sponge-like porous structural body of example 3 (detailed later). Measurements were done for each of the examples and comparative examples under a germicidal lamp with a peak intensity at 254 nm (ultraviolet), a black-light lamp with a peak intensity at 365 nm (ultraviolet), and a fluorescent lamp.

As could be understood from samples 1 to 3 in Table 2, the NOx gas concentration under 254-nm ultraviolet after passing through the titanium oxide-coated sponge-like porous structural body of example 1 was 2.88 ppm after the second passage and 0.91 ppm after the fifth passage. A large photocatalytic effect was confirmed. Under 365-nm ultraviolet, the NOx gas concentration was 1.72 ppm after the second passage and 0 ppm after the fifth passage. A marked photocatalytic effect was confirmed. Under a fluorescent lamp, the NOx gas concentration was 3.55 ppm after the fifth passage. Significant photocatalytic action was confirmed.

EXAMPLE 2

First, a polyurethane sponge-like initial structural body was immersed in a slurry. The initial structural body, shaped like a plate, was about 10 mm×50 mm×50 mm. The crosslinks of its sponge-like base structure were about 0.1 mm thick. Its cell count was about 18 cells per 25 mm. The slurry was a mixture of a carbon-supplying phenolic resin and a silicon powder with ethanol at Si/C=0.8 in moles. Next, with excess slurry having been removed, the sponge-like initial structural body was fired for an hour at 1000° C. in an argon atmosphere to carbonize it. The carbonized sponge-like initial structural body was heated in vacuum to 1450° C. for reaction sintering. The resulting sintered compact was simultaneously infiltrated with molten silicon weighing about 1.4 times the carbonized initial structural body, so as to form a sponge-like porous structural body. In short, the same reaction and manipulation procedures as example 1 were followed to prepare the sponge-like porous structural body of present example 2, except that the thickness of the crosslinks of the sponge-like base structure and the cell count were changed.

Then, titanium oxide was fixed to the sponge-like porous structural body as in example 1, so as to obtain a titanium oxide-coated sponge-like porous structural body in accordance with the present invention.

The titanium oxide-coated sponge-like porous structural body thus prepared had a molar SiC/Si ratio of about 1:1 and was shaped like a plate of about 10 mm×50 mm×50 mm. Further, as shown in Table 1, the structural body of example 2 had a bulk density of 0.17 g/cm$^3$, a porosity of 93.7%, and a specific surface area of about 0.1 m$^2$/g. This means that as in example 1, the titanium oxide-coated sponge-like porous structural body of example 2 was shaped like a plate of about 10 mm×50 mm×50 mm, retaining almost the same shape as the polyurethane sponge-like initial structural body. The thickness of the crosslinks was almost the same too. 0.4484 g of titanium oxide adhered. In addition, the optical transmittance of about 10-mm thick titanium oxide-coated sponge-like porous structural body under 365-nm ultraviolet was 0.34% as shown in Table 1. The titanium oxide-coated sponge-like porous structural body of example 2 exhibits a lower optical transmittance than that of example 1 due to a higher cell count. The former however has more titanium oxide adhering and boasts a greater photocatalytic effect.

According to samples 4 to 6 in Table 2, the NOx gas concentration after passing through the titanium oxide-coated sponge-like porous structural body of example 2 under 254-nm ultraviolet was 2.36 ppm after the second passage and 0.56 ppm after the fifth passage. A large photocatalytic effect confirmed. Under 365-nm ultraviolet, the NOx gas concentration was 1.37 ppm after the second passage and 0 ppm after the fifth passage. A marked photocatalytic effect was confirmed. Under a fluorescent lamp, the NOx gas concentration was 1.82 ppm after the fifth passage. Highly efficient photocatalytic action was confirmed under a fluorescent lamp. Accordingly, it would be understood that the three-dimensional fine cell-structured photocatalytic filter responds to visible light. In addition, as shown in FIG. 2(*a*), samples 4 to 6 indicate appreciable drops in the NOx gas concentrations over samples 10 to 15 which are comparative examples.

EXAMPLE 3

The same sponge-like porous structural body as the one of example 2 was immersed in a solution containing titanium oxide. The sample was dried and heated in an oxidizing atmosphere to 600° C. at a rate of 10° C. per minute. The sample was then maintained in those conditions for one hour before being cooled down to room temperature. Otherwise, the same reaction and manipulation procedures as in example 2 were followed to prepare a titanium oxide-coated sponge-like porous structural body in accordance with the present invention.

According to samples 7 to 9 in Table 2, the NOx gas concentration after passing through the titanium oxide-coated sponge-like porous structural body of example 3 under 254-nm ultraviolet was 3.62 ppm after the third passage and 2.79 ppm after the fifth passage. A large photocatalytic effect was confirmed. Under 365-nm ultraviolet, the NOx gas concentration was 2.91 ppm after the second passage and 0.99 ppm after the fifth passage. A marked photocatalytic effect was confirmed. Under a fluorescent lamp, the NOx gas concentration was 3.46 ppm after the fifth passage. Photocatalytic action was confirmed under a fluorescent lamp. Samples 7 to 9 in FIG. 2(*b*) indicate appreciable drops in the NOx gas concentration over samples 10 to 15 which are comparative examples shown in FIG. 2(*a*). In addition, it could be understood that a larger photocatalytic effect was obtained if the sample was heated up to 400° C. and retained for an hour as in example 2 (samples 4 to 6 in (FIG. 2(*b*)) than if the sample was heated up to 600° C. and retained for an hour (samples 7 to 9).

EXAMPLE 4

Figure 5:
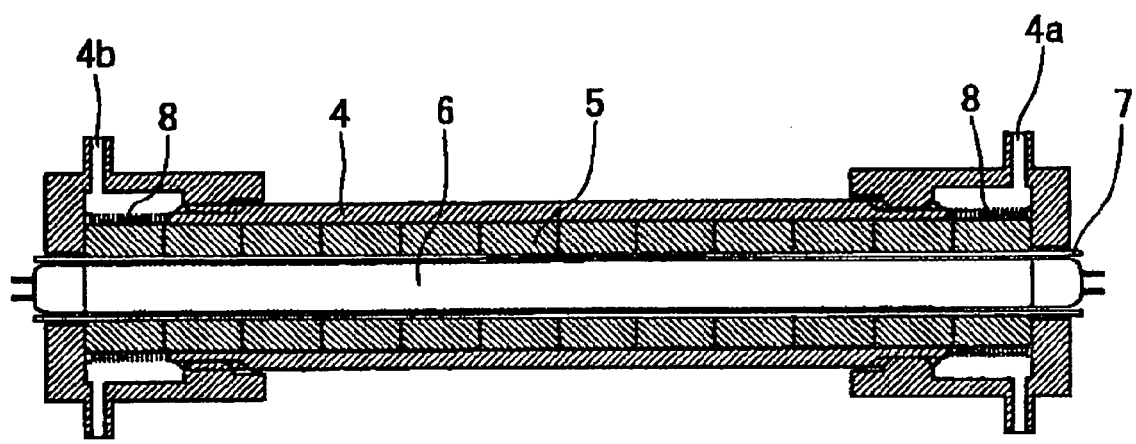
FIG. 5 is a cross-sectional view of another purifier device equipped with an internal light source in accordance with another embodiment of the present invention.

In present example 4, a sponge-like porous structural body coated with titanium oxide under the same conditions as in example 2 was processed so that it was operable in a purifier device. The structural body was placed in a purifier device for measurement. First, the sponge-like porous structural body was processed to an annular filter unit with measuring about 31 mm in inside diameter, about 41 mm in outside diameter, and about 30 mm in height. These structural bodies were then stacked to prepare an annular filter unit stack, about 350 mm high. The annular filter unit stack was placed in a purifier device shown in FIG. 5 as a photocatalytic filter (annular, visible-light-responsive, three-dimensional fine cell-structured photocatalytic filter 5) in accordance with the present invention. The purifier device contained an about 450-mm long double layer tube made of a container 4 and an internal tube (quartz tube) 7. The container 4 was an acrylic enclosure tube with an inside diameter of 45 mm and had a fluid inlet 4a and a fluid outlet 4b on opposite ends. The internal tube 7 had an outside diameter of 30 mm, housed a light source 6 in it, and had an optically transparent structure.

The light source 6 was a fluorescent lamp, a black-light lamp with a peak intensity at 365 nm (ultraviolet), and a germicidal lamp with a peak intensity at 254 nm (ultraviolet). In present example 4, air containing a 15 ppm to 0 ppm NOx gas was passed through the purifier device at 500 mL/minute. NOx gas concentrations were measured.

Figure 3:
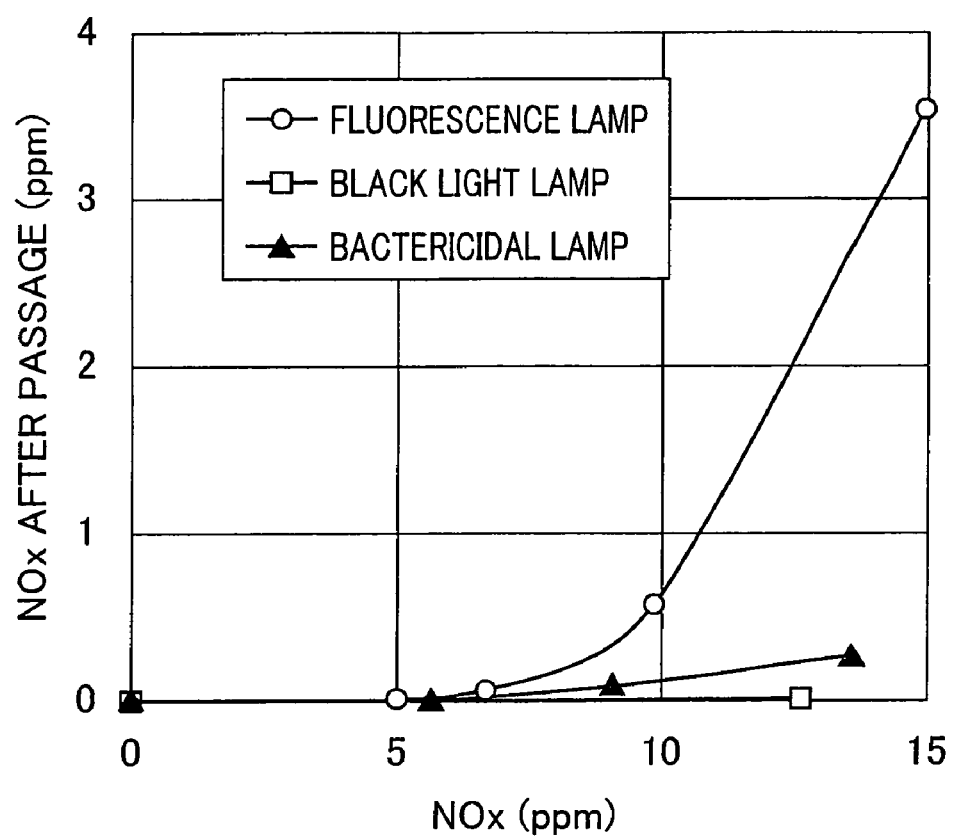
FIG. 3 is a graph depicting the photocatalytic action of a purifier device equipped with a titanium oxide-coated sponge-like porous structural body in accordance with the present invention in terms of decomposition of NOx.

Table 3 shows the NOx gas measurements with the purifier device. FIG. 3 shows the photocatalytic action of purifier devices containing the titanium oxide-coated sponge-like porous structural bodies in accordance with the present invention shown in Table 3, in terms of decomposition of NOx.

TABLE 3

| | | units: ppm | | | | |
|---|---|---|---|---|---|---|
| Germicidal Lamp (254 nm) | Before Passage | 0 | 5.61 | 8.97 | 13.6 | — |
| | After Passage | 0 | 0 | 0.10 | 0.29 | — |
| Black-light Lamp (365 nm) | Before Passage | 0 | 12.62 | — | — | — |
| | After Passage | 0 | 0.02 | — | — | — |
| Fluorescent lamp | Before Passage | 0 | 5.00 | 6.63 | 9.79 | 14.96 |
| | After Passage | 0 | 0 | 0.04 | 0.57 | 3.53 |

As could be understood from Table 3 and FIG. 3, under the fluorescent lamp, the NOx gas concentration fell almost to 0 ppm after the first passage if the initial NOx gas was about 7 ppm and to 3.5 ppm after the first passage if the initial NOx gas was 15 ppm. The latter figure would have been brought to 0 ppm if two of the same purifier devices had been coupled in series. Under the black-light lamp (peak wavelength=365 nm), the initial NOx gas concentration of about 12 ppm dropped to substantially 0 ppm after the first passage. Under the germicidal lamp (peak wavelength=254 nm), the initial NOx gas concentration of 9 ppm dropped to substantially 0 ppm after the first passage, and the NOx gas of about 13 ppm was decomposed to 0.3 ppm. This means that the three-dimensional fine cell-structured photocatalytic filters containing the sponge-like porous structural bodies of example 4 exhibit great photocatalytic effect whether under a fluorescent lamp, a black-light lamp, or a germicidal lamp.

EXAMPLE 5

Unlike example 2, no mixture of a phenolic resin and a silicon powder with ethanol was used as the slurry. Instead, an ethanol solution of a carbon-supplying phenolic resin (no silicon powder) was used. The same polyurethane sponge-like initial structural body as in example 2 was immersed in the solution. After removing excess solution, the initial structural body was fired for one hour at 1000° C. in an argon atmosphere to carbonize it, so as to prepare a sponge-like porous structural body. The carbonized sponge-like porous structural body was immersed in a solution containing or generating titanium oxide; dried, and fired at 100° C. to 500° C. in an oxidizing atmosphere to fix titanium oxide. Otherwise, the same reaction and manipulation procedures as in example 2 were followed to prepare a titanium oxide-coated sponge-like porous structural body in accordance with the present invention.

The titanium oxide-coated sponge-like porous structural body of present example 5 thus prepared was shaped like a plate made of amorphous carbon measuring about 8 mm×44 mm×44 mm. The structural body was electrically conducting and shrank about 12%. The titanium oxide-coated sponge-like porous structural body had a bulk density of 0.06 g/cm$^3$, a porosity of 97%, and a specific surface area of about 0.1 m$^2$/g. 0.242 g of titanium oxide adhered. The titanium oxide-coated sponge-like porous structural body of the present example was easier to manufacture than that of example 2, because the former does not involve reaction sintering at 1450° C., infiltration with molten silicon, or addition of silicon powder.

Table 4 shows photocatalytic action of the titanium oxide-coated sponge-like porous structural body in terms of decomposition of NOx.

TABLE 4

| | | | NOx gas concentration (ppm) | | | | | |
|---|---|---|---|---|---|---|---|---|
| Sample | | | No. of Passages | | | | | |
| No. | | | 0 | 1 | 2 | 3 | 4 | 5 |
| 16 | Ex. 5 | * 254 nm | 4.99 | 2.78 | 1.29 | 0.51 | 0.18 | 0.06 |
| 17 | | * 365 nm | 4.69 | 2.32 | 0.99 | 0.39 | 0.15 | 0.06 |
| 18 | | Fluorescence | 5.02 | 4.54 | 4.02 | 3.46 | 2.88 | 2.32 |
| 19 | Ex. 6 | * 254 nm | 4.93 | 2.19 | 0.58 | 0.09 | 0.01 | 0.00 |
| 20 | | * 365 nm | 5.06 | 1.41 | 0.31 | 0.06 | 0.01 | 0.00 |
| 21 | | Fluorescence | 5.03 | 4.41 | 3.68 | 2.87 | 2.06 | 1.34 |

* Germicidal lamp for 254 nm, black-light lamp for 365 nm

Figure 4:
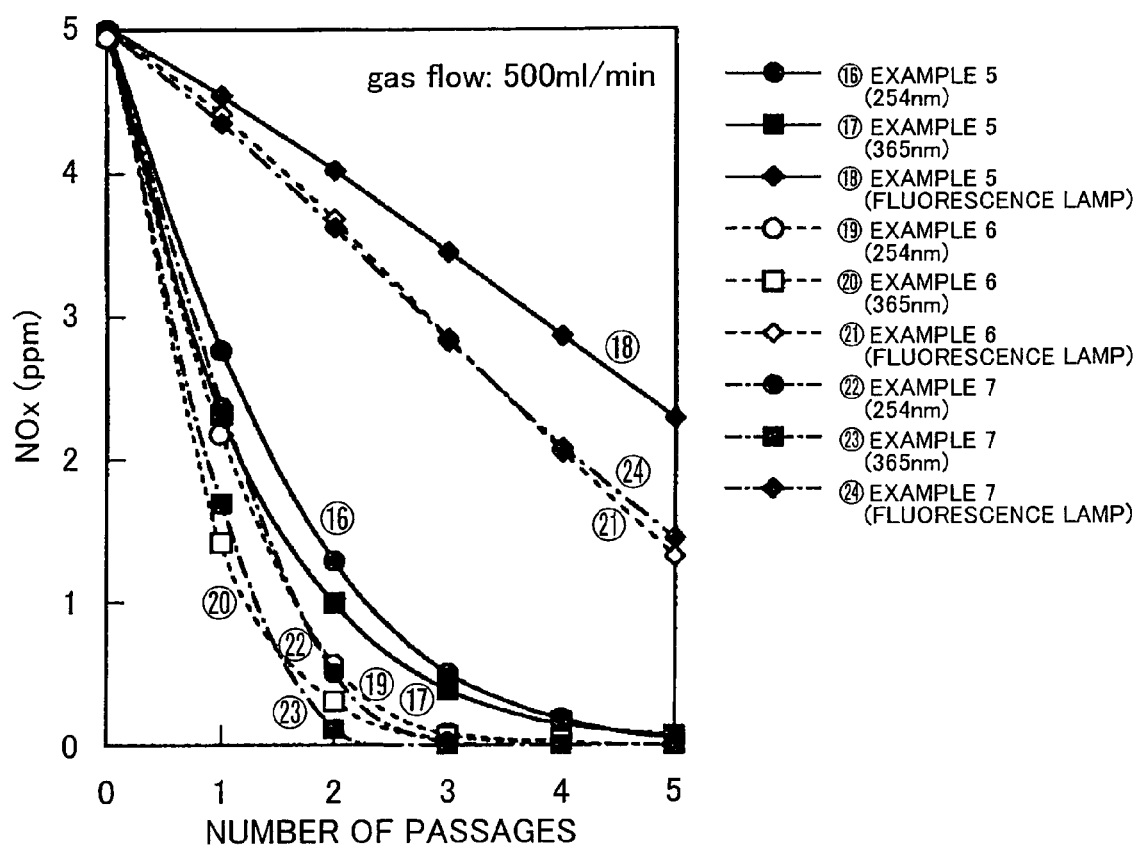
FIG. 4 is a graph depicting the photocatalytic action of other titanium oxide-coated sponge-like porous structural bodies in accordance with the present invention in terms of decomposition of NOx.

FIG. 4 is graphs representing the photocatalytic action of the titanium oxide-coated sponge-like porous structural bodies in accordance with the present invention in terms of decomposition of NOx, along with the photocatalytic action shown in Table 4 and Table 5 (detailed later). In FIG. 4, sample numbers are encircled.

As shown in Table 4 and FIG. 4, the NOx gas concentration under 254-nm ultraviolet after passing through the titanium oxide-coated sponge-like porous structural body was 1.29 ppm after the second passage and 0.06 ppm after the fifth passage. A large photocatalytic effect was confirmed. Under 365-nm ultraviolet, the NOx gas concentration was 0.99 ppm after the second passage and 0.06 ppm after the fifth passage. A marked photocatalytic effect was confirmed. Under a fluorescent lamp, the NOx gas concentration was 2.32 ppm after the fifth passage. Photocatalytic action of the fluorescent lamp was confirmed.

EXAMPLE 6

In example 2, a slurry was used which was a mixture of a phenolic resin and a silicon powder with ethanol. The same polyurethane sponge-like initial structural body as in example 2 was immersed in the slurry. After removing excess slurry, the initial structural body was fired for one hour at 1000° C. in an argon atmosphere to carbonize it. By doing so, a sponge-like porous structural body obtained without the reaction sintering at 1450° C. or the infiltration with molten silicon was used to fix titanium oxide. Otherwise, the same reaction and manipulation procedures as in example 2 were followed to prepare a titanium oxide-coated sponge-like porous structural body in accordance with the present invention.

The titanium oxide-coated sponge-like porous structural body of present example 6 thus prepared was shaped like a plate made of a mixture of amorphous carbon and the silicon powder measuring about 10 mm×50 mm×50 mm. The structural body had a bulk density of 0.07 g/cm$^3$, a porosity of 97%, and a specific surface area of about 68 m$^2$/g. 0.400 g of titanium oxide adhered. The titanium oxide-coated sponge-like porous structural body of the present example was easier to manufacture than that of example 2, because the former does not involve reaction sintering at 1450° C. or infiltration with molten silicon.

As shown in Table 4 and FIG. 4, the NOx gas concentration under 254-nm ultraviolet after passing through the titanium oxide-coated sponge-like porous structural body was 1.29 ppm after the second passage and 0.06 ppm after the fifth passage. A large photocatalytic effect was confirmed. Under 365-nm ultraviolet, the NOx gas concentration was 0.58 ppm after the second passage and 0.00 ppm after the fifth passage. A large photocatalytic effect was confirmed. Under 365-nm ultraviolet, the NOx gas concentration was 0.31 ppm after the second passage and 0.00 ppm after the fifth passage. A marked photocatalytic effect was confirmed. Under a fluorescent lamp, the NOx gas concentration was 1.34 ppm after the fifth passage. High photocatalytic action of the fluorescent lamp was confirmed.

EXAMPLE 7

First, a polyurethane sponge-like initial structural body was immersed in a slurry. The initial structural body, shaped like a plate, was about 10 mm×50 mm×50 mm. The crosslinks of its sponge-like base structure were about 0.2 mm thick on average. Its cell count was about 18 cells per 25 mm. The slurry was a mixture of a carbon-supplying phenolic resin and a hydrogenated titanium powder with ethanol at Ti/C=0.6 in moles. Next, with excess slurry having been removed, the sponge-like initial structural body was fired for an hour at 1000° C. in an argon atmosphere to carbonize it. Thereafter, the same reaction and manipulation procedures as in example 1 were followed, so as to fix titanium oxide onto the carbonized sponge-like initial structural body at 400° C. in an oxidizing atmosphere.

Table 5 shows NOx-decomposing photocatalytic action of a titanium oxide-coated sponge-like porous structural body made of titanium and carbon under a germicidal lamp, a black-light lamp, and a fluorescent lamp.

As shown in Table 5 and FIG. 4, the NOx gas concentration under 254-nm ultraviolet after passing through the titanium oxide-coated sponge-like porous structural body was 0.51 ppm after the second passage and 0.00 ppm after the fifth passage. A large photocatalytic effect was confirmed. Under 365-nm ultraviolet, the NOx gas concentration was 0.10 ppm after the second passage and 0.00 ppm after the fifth passage. A marked photocatalytic effect was confirmed. Under a fluorescent lamp, the NOx gas concentration was 1.46 ppm after the fifth passage. Large photocatalytic action of the fluorescent lamp was confirmed.

TABLE 5

| Sample No. | | | NOx gas concentration (ppm) | | | | | |
|---|---|---|---|---|---|---|---|---|
| | | | No. of Passages | | | | | |
| | | | 0 | 1 | 2 | 3 | 4 | 5 |
| 22 | Ex. 7 | * 254 nm | 5.07 | 2.40 | 0.51 | 0.01 | 0.00 | 0.00 |
| 23 | | * 365 nm | 5.12 | 1.69 | 0.10 | 0.00 | 0.00 | 0.00 |
| 24 | | Fluorescence | 5.03 | 4.36 | 3.63 | 2.85 | 2.11 | 1.46 |

* Germicidal lamp for 254 nm, black-light lamp for 365 nm

COMPARATIVE EXAMPLE 1

A silicon carbide ceramic form #06 (about 6 cells per 25 mm), available from Bridgestone Corporation, was used to coat with titanium oxide, to prepare a titanium oxide-coated sponge-like porous structural body for comparative purposes. Ceramic form #06 had a bulk density of 0.55 g/cm$^3$ and a porosity of 83%, and was shaped like a plate measuring about 10 mm×50 mm×50 mm. As shown in Table 1, the titanium oxide-coated sponge-like porous structural body for comparative purposes prepared in present comparative example 1 had an optical transmittance of 5.06% under 365-nm ultraviolet. 0.1361 g of titanium oxide adhered. The optical transmittance of the titanium oxide-coated sponge-like porous structural body for comparative purposes prepared in present comparative example 1 is substantially equal to the optical transmittance of the titanium oxide-coated sponge-like porous structural body in accordance with the present invention prepared in example 1. The former had more titanium oxide adhering thereto than the latter.

However, as in examples 1 to 3, air containing a 5 ppm NOx gas was passed through the titanium oxide-coated sponge-like porous structural body for the comparative purposes at 500 mL/minute. The NOx gas concentration was then measured. As indicated by sample 10 in Table 2, under 254-nm ultraviolet, the NOx gas concentration was 4.8 ppm after the second passage and 4.07 ppm after the fifth passage. NOx gas reducing effect was very small. As indicated by sample 11, under 365-nm ultraviolet, the NOx gas concentration was 4.81 ppm after the second passage and 4.73 ppm after the fifth passage. The NOx gas concentration hardly dropped. Under a fluorescent lamp (sample 12), the NOx gas concentration was 4.96 ppm after the fifth passage. No photocatalytic action could be confirmed. FIG. 2(a) also clearly shows no decreases in the NOx gas concentration. This means that conversely, as indicated by sample 6 of example 2, the titanium oxide-coated sponge-like porous structural body in accordance with the present invention undoubtedly responds to visible light. When compared with the titanium oxide-coated sponge-like porous structural body prepared in example 1, the titanium oxide-coated sponge-like porous structural body for comparative purposes prepared in present comparative example 1 has substantially the same optical transmittance and displays poorer photocatalytic action despite more adhesion of titanium oxide. These facts demonstrate how excellent the photocatalytic action of the titanium oxide-coated sponge-like porous structural body in accordance with the present invention is.

COMPARATIVE EXAMPLE 2

A silicon carbide ceramic form #13 (about 13 cells per 25 mm), available from Bridgestone Corporation, was to used to coat with titanium oxide, to prepare a titanium oxide-coated sponge-like porous structural body for comparative purposes. Ceramic form #13 had a bulk density of 0, 57 g/cm$^3$ and a porosity of 82%, and was shaped like a plate measuring about 10 mm×50 mm×50 mm. As shown in Table 1, the titanium oxide-coated sponge-like porous structural body for comparative purposes prepared in present comparative example 2 had an optical transmittance of 0.17% under 365-nm ultraviolet. 0.2293 g of titanium oxide adhered. When compared to example 1 where the cell count was the same, the optical transmittance was lower, yet more titanium oxide adhered.

However, as in examples 1 to 3, air containing a 5 ppm NOx gas was passed through the titanium oxide-coated sponge-like porous structural body for comparative purposes at 500 mL/minute to measure the NOx gas concentration. As indicated by sample 1-3 in Table 2, the NOx gas concentration under 254-nm ultraviolet was 4.56 ppm after the second passage and 3.86 ppm after the fifth passage. NOx gas reducing effect was very small. As indicated by sample 14, under 365-nm ultraviolet, the NOx gas concentration was 4.4 ppm after the second passage and 3.68 ppm after the fifth passage. The NOx gas concentration hardly dropped. Under a fluorescent lamp, the NOx gas concentration was 4.84 ppm after the fifth passage. No photocatalytic action could be confirmed.

COMPARATIVE EXAMPLE 3

Unlike example 1, a sponge-like porous structural body with no titanium oxide coating was used. Air containing a 5 ppm NOx gas was passed through a titanium oxide-coated sponge-like porous structural body for comparative purposes at 500 mL/minute, as in examples 1 to 3. After each passage, the NOx gas concentration was measured. As shown in Table 2, under 254-nm ultraviolet, the NOx gas concentration was 4.83 ppm after the second passage and 4.66 ppm after the fifth passage. The NOx gas decomposed without the presence of titanium oxide. Effect was however very small. Under 365-nm ultraviolet, the NOx gas concentration was 4.93 ppm after the second passage and almost the same after the fifth passage. The NOx gas concentration did not drop.

COMPARATIVE EXAMPLE 4

Comparative example 4 used the sponge-like porous structural body with no titanium oxide coating of example 2. Air containing a 5 ppm NOx gas was passed through a titanium oxide-coated sponge-like porous structural body for comparative purposes at 500 mL/minute as in examples 1 to 3. After each passage, the NOx gas concentration was measured. As shown in Table 2, under 254-nm ultraviolet, the NOx gas concentration was 4.85 ppm after the second passage and 4.65 ppm after the fifth passage. The NOx gas decomposed without the presence of titanium oxide. Effect was however very small. Under 365-nm ultraviolet, the NOx gas concentration was 4.95 ppm after the second passage and almost the same after the fifth passage. The NOx gas concentration did not drop.

The invention being thus described, it will be obvious that the same way, may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The visible-light-responsive three-dimensional fine cell-structured photocatalytic filter in accordance with the present invention is applicable to purifier devices capable of purifying polluted air containing NOx and/or other toxic substances and obtaining clean water from polluted water at high efficiency.

The invention claimed is:

1. A visible-light-responsive three-dimensional fine cell-structured photocatalytic filter, being characterized in that said filter has a sponge-like porous structure (B) having a surface on which a titanium oxide coating is provided,
wherein said sponge-like porous structure (B) is prepared by: immersing, in a solution containing or generating titanium oxide, a sponge-like porous structural body (A) containing silicon carbide and at least one material selected from the group consisting of silicon, a silicon alloy, and carbon and having a porosity of 85 vol % or more; drying said immersed structural body (A); and thereafter firing said dried structural body (A) at 100° C. to 800° C. in an oxidizing atmosphere.

2. The visible-light-responsive three-dimensional fine cell-structured photocatalytic filter of claim 1, wherein:
said sponge-like porous structural body (A) contains silicon carbide and either or both of silicon and a silicon alloy;
said sponge-like porous structure (B) has a sponge-like base structure with crosslinks which have an average thickness of 1 mm or less and contains silicon and silicon carbide in a Si/SiC molar ratio of 0.1 to 4.

3. The visible-light-responsive three-dimensional fine cell-structured photocatalytic filter of claim 1, wherein said sponge-like porous structural body (A) is composed of silicon carbide and either or both of silicon and a silicon alloy.

4. The visible-light-responsive three-dimensional fine cell-structured photocatalytic filter of claim 1 or claim 3, wherein: the silicon alloy contains at least one material selected from the group consisting of magnesium, aluminum, titanium, chromium, manganese, iron, cobalt, nickel, copper, zinc, zirconium, niobium, molybdenum, and tungsten.

5. The visible-light-responsive three-dimensional fine cell-structured photocatalytic filter of claim 1 or claim 3, wherein: said sponge-like porous structure (B) contains free silicon.

6. The visible-light-responsive three-dimensional fine cell-structured photocatalytic filter of claim 1, wherein the carbon is amorphous carbon.

7. A purifier device, being characterized by comprising the visible-light-responsive three-dimensional fine cell-structured photocatalytic filter of claim 1.

8. The purifier device of claim 7, comprising:
a container having a fluid inlet and a fluid outlet on opposite sides and an external optically transparent area allowing visible and/or ultraviolet light to pass therethrough; and
a photocatalytic filter provided inside the container,
wherein the photocatalytic filter purifies fluid coming in through the fluid inlet by visible and/or ultraviolet light received through the optically transparent area and discharges the purified fluid through the fluid outlet,
said purifier device being capable of functioning under visible light,
wherein the photocatalytic filter contains a filter unit containing the visible-light-responsive three-dimensional fine cell-structured photocatalytic filter, the filter being planar.

9. The purifier device of claim 7, comprising:
a container having a fluid inlet and a fluid outlet on opposite sides;
an annular photocatalytic filter, provided inside the container, having a cylindrical space therein; and
a light source, provided in the cylindrical space of the annular photocatalytic filter, for shining visible and/or ultraviolet light,
wherein the photocatalytic filter purifies fluid coming in through the fluid inlet by the visible and/or ultraviolet light shone by the light source and discharges the purified fluid through the fluid outlet,
said purifier device being capable of functioning under visible light,
wherein the photocatalytic filter contains a filter unit containing the visible-light-responsive three-dimensional fine cell-structured photocatalytic filter, the filter being annular.

10. A method of manufacturing a visible-light-responsive three-dimensional fine cell-structured photocatalytic filter, being characterized by the sequential steps of:

immersing, in a solution containing or generating titanium oxide, a sponge-like porous structural body (A) containing silicon carbide and at least one material selected from the group consisting of silicon, a silicon alloy, and carbon and having a porosity of 85 vol % or more;

drying said immersed structural body (A); and firing said dried structural body (A) at 100° C. to 800° C. in an oxidizing atmosphere.

11. The method of claim 10, wherein said sponge-like porous structural body (A) is composed of silicon carbide and either or both of silicon and a silicon alloy.

12. The method of claim 10, wherein after an initial structural body (C) having a sponge-like base structure and thermally decomposing when carbonized is impregnated with a slurry containing a carbon-supplying resin and either or both of a silicon powder and a silicon alloy, said initial structural body (C) is carbonized at 800° C. to 1300° C. in an inert atmosphere and then reaction sintered at 1300° C. or above, so as to form said sponge-like porous structural body (A).

13. The method of claim 12, wherein a sintered compact obtained in the reaction sintering is further melt infiltrated with either or both of silicon and a silicon alloy at 1300° C. to 1800° C., so as to form said sponge-like porous structural body (A).

14. The method of claim 10, wherein said sponge-like porous structural body (A) has a sponge-like base structure formed by:

impregnating an initial structural body (C) with a slurry containing a carbon- supplying resin and either or both of a silicon powder and a silicon alloy, said initial structural body (C) containing either a polymer compound or a natural fiber, thread or paper with a sponge-like base structure;

thereafter carbonizing said impregnated initial structural body (C) at 800° C. to 1300° C. in an inert atmosphere; and then reaction sintering said carbonized initial structural body (C) at 1300° C. or above.

15. The method of claim 14, wherein said sponge-like porous structural body (A) has a sponge-like base structure formed by further melt infiltrating a sintered compact obtained in the reaction sintering with either or both of silicon and a silicon alloy at 1300° C. to 1800° C.

16. The method of claim 13 or claim 15, wherein:

the sponge-like base structure of said initial structural body (C) has crosslinks having an average thickness of 1 mm or less; and said initial structural body (C) is impregnated with either or both of silicon and a silicon alloy containing silicon and silicon carbide in a Si/SiC molar ratio of 0.1 to 4, so as to form said sponge-like porous structural body (A) with said initial structural body (C) preserving a shape thereof.

17. The method of claim 12 or claim 14, wherein:

the sponge-like base structure of said initial structural body (C) has crosslinks having an average thickness of 1 mm or less; and said sponge-like porous structural body (A) is formed with said initial structural body (C) preserving a shape thereof, using silicon powder and/or a silicon alloy containing silicon and carbon in a Si/C molar ratio of 0.1 to 2.

18. The method of any one of claims 12-15, wherein the slurry further contains at least one powder selected from the group consisting of silicon carbide, silicon nitride, boron carbide, alumina, silica, mullite, and zirconia.

* * * * *